United States Patent
Tsujita et al.

(10) Patent No.: US 9,261,029 B2
(45) Date of Patent: Feb. 16, 2016

(54) MULTI-CYLINDER GASOLINE ENGINE

(71) Applicant: Mazda Motor Corporation, Aki-gun, Hiroshima (JP)

(72) Inventors: Shuhei Tsujita, Hiroshima (JP); Tatsuya Koga, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 288 days.

(21) Appl. No.: 13/865,939

(22) Filed: Apr. 18, 2013

(65) Prior Publication Data
US 2013/0284146 A1 Oct. 31, 2013

(30) Foreign Application Priority Data
Apr. 26, 2012 (JP) .................................. 2012-101358

(51) Int. Cl.
*F02D 9/04* (2006.01)
*F02D 11/00* (2006.01)
*F02D 13/02* (2006.01)

(52) U.S. Cl.
CPC ........ *F02D 11/00* (2013.01); *F02D 9/04* (2013.01); *F02D 13/0276* (2013.01); *Y02T 10/18* (2013.01)

(58) Field of Classification Search
CPC .............. F02D 9/04; F02D 9/06; F02D 9/00; F02D 13/0276
See application file for complete search history.

(56) References Cited

U.S. PATENT DOCUMENTS 7,290,524 B2    11/2007  Kobayashi
2005/0098148 A1*  5/2005  Kuzuyama et al. ........... 123/315
2011/0239638 A1* 10/2011  Yamagata et al. .............. 60/324

FOREIGN PATENT DOCUMENTS

JP            2009091994 A    4/2009

* cited by examiner

*Primary Examiner* — Lindsay Low
*Assistant Examiner* — Jacob Amick
(74) *Attorney, Agent, or Firm* — Alleman Hall McCoy Russell & Tuttle LLP

(57) ABSTRACT

A multi-cylinder gasoline engine is provided. The engine includes an engine body having a plurality of cylinders, an exhaust manifold through which exhaust gas discharged from each of the cylinders of the engine body passes, and a controller for controlling various instruments provided to the engine body and the exhaust manifold. The engine body includes a switch mechanism. The exhaust manifold includes a plurality of independent exhaust passages, a gathering section, a negative pressure generating device, bypass passages, and openable-and-closable flow switch valves. The controller controls the injector, the ignition plug, the switch mechanism, and the flow switch valve so that a CI combustion is performed within a predetermined first operating range and an SI combustion is performed within a second operating range set on a higher engine load side than the first operating range.

9 Claims, 14 Drawing Sheets

MULTI-CYLINDER GASOLINE ENGINE

BACKGROUND

The present invention relates to a multi-cylinder gasoline engine including an engine body having a plurality of cylinders, an exhaust manifold through which exhaust gas discharged from each cylinder of the engine body passes, and a controller for controlling various components contained in the engine body and the exhaust manifold.

Conventionally, in the field of gasoline engines, a spark-ignition combustion has been generally adopted, in which mixture gas is forcibly combusted by a spark-ignition of an ignition plug; however, instead of such a spark-ignition combustion, an application of a so called compressed self-ignition combustion to gasoline engine has been under study. Compressed self-ignition combustion indicates a combustion in which mixture gas self-ignites to combust under an environment at a high temperature and pressure created by the compression of a piston. Compressed self-ignition combustion includes multiple combustions in which mixture gas in cylinders simultaneously self-ignites to combust, and a combustion period is shorter than a spark-ignition combustion in which the combustion gradually spreads by flame propagation. Therefore, it has been said that a high thermal efficiency can be obtained by compressed self-ignition combustion. Note that, hereinafter, spark-ignition combustion is simply referred to as "the SI combustion" and compressed self-ignition combustion is simply referred to as "the CI combustion."

For example, JP2009-091994A and U.S. Pat. No. 7,290, 524B2 (2007-132319A) disclose gasoline engines applied with the CI combustion.

In JP2009-091994A, an art is disclosed in which a combustion mode is switched according to an engine load, for example, the CI combustion is performed within a low engine load range and the SI combustion is performed within a high engine load range.

In U.S. Pat. No. 7,290,524B2 (2007-132319A), an art is disclosed in which in the CI combustion operation, an exhaust valve is not only opened on exhaust stroke but also on intake stroke, and high-temperature exhaust gas (burnt gas) which is discharged once, flows back into a cylinder from an exhaust port, so that an in-cylinder temperature increases and a self-ignition of mixture gas is stimulated. Note that, hereinafter, the flowback operation of exhaust gas as described in U.S. Pat. No. 7,290,524B2 (2007-132319A) is referred to as "the internal EGR" (Internal Exhaust Gas Recirculation).

Here, when the internal EGR is performed to stimulate the self-ignition of the mixture gas as U.S. Pat. No. 7,290,524B2 (2007-132319A), and especially within an extremely low engine load range where a fuel injection amount is small (and thus ignitability easily degrades), it is required to input a large amount of high-temperature exhaust gas into the cylinder by the internal EGR. However, a sufficient amount of exhaust gas cannot be inputted into the cylinder by only opening the exhaust valve on intake stroke as U.S. Pat. No. 7,290,524B2 (2007-132319A), and it may cause an insufficient increase in temperature inside the cylinder.

Moreover, in surely achieving the CI combustion within the low engine load range, it is effective to increase a compression ratio of the engine; however, when the compression ratio of the engine increases, a problem arises that an abnormal combustion, such as knocking, easily occurs within the high engine load range where the fuel injection amount is increased.

The present invention is made in view of the above situations and provides a multi-cylinder gasoline engine that can achieve both securing ignitability when performing CI combustion within a low engine load range and preventing an abnormal combustion when performing SI combustion within a high engine load range.

SUMMARY

According to one aspect of the invention, a multi-cylinder gasoline engine is provided. The multi-cylinder gasoline engine includes an engine body having a plurality of cylinders, an exhaust manifold through which exhaust gas discharged from each of the cylinders of the engine body passes, and a controller for controlling various instruments provided to the engine body and the exhaust manifold. The engine body has a switch mechanism having, for each cylinder, an injector for injecting fuel containing gasoline and an ignition plug for igniting mixture gas by spark discharge. The switch mechanism switches a mode of an exhaust valve for opening and closing an exhaust port of the cylinder between a normal mode in which the exhaust valve is only opened on exhaust stroke and an open-twice mode in which the exhaust valve is also opened on intake stroke in addition to the exhaust stroke. The exhaust manifold has a plurality of independent exhaust passages of which upstream end parts are connected with either one of the exhaust port of a single cylinder and the exhaust ports of two or more cylinders where the exhaust order is not adjacent thereamong. The exhaust manifold also has a gathering section where downstream end parts of the independent exhaust passages are bundled while maintaining the independent state from each other. The exhaust manifold also has a negative pressure generating device provided downstream of the gathering section and having a nozzle part formed to taper so that a negative pressure is generated due to the discharge of the exhaust gas from the downstream end part of the independent exhaust passage. The exhaust manifold also has bypass passages extending by branching from respective intermediate parts of the independent passages, merging on the downstream side, and communicating with an exhaust passage positioned downstream of the negative generating device The exhaust manifold also has openable-and-closable flow switch valves provided in the respective bypass passages. The controller controls the injector, the ignition plug, the switch mechanism, and the flow switch valve so that a CI combustion that is caused by a self-ignition of the mixture gas is performed within a predetermined first operating range and an SI combustion that is forcibly caused by a spark-ignition is performed within a second operating range set on a higher engine load side than the first operating range. Within the first operating range, the switch mechanism is controlled so that the exhaust valve is operated in the open-twice mode and the flow switch valve is opened so that the exhaust gas bypasses the negative pressure generating device through the bypass passage, and within at least a part of the second operating range on its high engine load side, the switch mechanism is controlled so that the exhaust valve is operated in the normal mode and the flow switch valve is closed so that the exhaust gas passes the negative pressure generating device.

Note that, the phrase "the fuel containing gasoline" has the concept that it includes not only gasoline 100% fuel, but also a mixture of gasoline and other fuel constituent. For example, the CI combustion can also be achieved by fuel in which ethanol (alcohol) and gasoline are mixed; therefore, the present invention can also be applied to an engine driven by such kind of fuel.

In the present invention, within the first operating range with relatively low engine load, by operating the exhaust valve in the open-twice mode (the mode of opening on the intake stroke in addition to the exhaust stroke), the internal EGR in which the high temperature exhaust gas flows back into the cylinder from the exhaust ports of the cylinders is achieved, and as a result, the in-cylinder temperature is increased. In this manner, within the first operating range where the engine load is low and the ignitability of the mixture gas is low, the self-ignition of the mixture gas is stimulated, resulting in an appropriate CI combustion. Additionally, within the first operating range, because the flow of the exhaust gas from the cylinders is switched so that the exhaust gas passes through the bypass passages (bypasses the negative pressure generating device), the ejector effect due to the generative pressure generated in the negative pressure generating device (the downstream suction effect of the exhaust gas) is invalidated and, as a result, when the blowdown gas (exhaust gas discharged swiftly immediately after the exhaust valve is opened) is discharged from one cylinder, a large positive pressure generated by the blowdown gas acts on the exhaust port of a preceding cylinder of which the exhaust order is immediately before the cylinder, and inhibits the discharge of the exhaust gas (exhaust interference). In this embodiment, by operating the exhaust valve in the open-twice mode in a state with purposely created exhaust interference, a large amount of exhaust gas flows back into the cylinder from the exhaust port, and the internal EGR gas amount may be increased. This becomes advantageous in increasing the in-cylinder temperature and leads to self-ignition stimulation of the mixture gas, resulting in surely triggering the CI combustion within the low engine load range.

On the other hand, within the second operating range with higher engine load than the within first operating range (at least within the partial range on the high engine load side therein), the open/close mode of the exhaust valve is switched to the normal mode and the internal EGR is prohibited, and the flow switch valve is closed and the exhaust gas flows into the negative pressure generating device. Therefore, the negative pressure generated in the negative pressure generating device reaches the exhaust port and the downward suction of the exhaust gas (ejector effect) is stimulated, and thus, it is prevented that the high temperature exhaust gas remains inside the cylinder. Moreover, within the second operating range, because the SI combustion by the spark-ignition is performed in the state where scavenging ability inside the cylinder is secured as described above, even without a measure of greatly retarding the timing of the spark-ignition for example, an appropriate combustion with no abnormal combustion may be achieved, and a high heat release rate may be obtained while preventing the abnormal combustion.

Preferably, in this aspect of the present invention, a middle operating range where the CI combustion is performed is set between the first and second operating ranges. Within the middle operating range, the switch mechanism is controlled so that the exhaust valve is operated in the open-twice mode, and an opening of the flow switch valve is reduced as the engine load becomes higher.

According to such a configuration, within the middle operating range where the engine load is higher than the first operating range on the low engine load side and the mixture gas comparatively easily self-ignites through adjusting the exhaust gas amount for flowing into the negative pressure generating device by the opening control of the flow switch valve, the exhaust gas suction action based on the negative pressure generated in the negative pressure generating device (ejector effect) may be intensified as the engine load becomes higher, and accordingly, the internal EGR gas amount may be reduced. In this manner, within the middle operating range with medium level of engine load, an appropriate amount of internal EGR gas according to the ignitability may be introduced, and an appropriate CI combustion may be performed.

Preferably, in such a configuration, within the first operating range, a ratio of gas and air with the fuel obtained from dividing a mass of the entire gas inside the cylinder by a mass of the fuel is set to 30:1 or above which is higher than that within the second and middle operating ranges.

According to such a configuration, by introducing a large amount of gas containing the EGR gas and fresh air into the cylinder within the first operating range with relatively low engine load, the G/F becomes lean and a generation of NOx (Nitrogen Oxide) is suppressed. Moreover, a pumping loss during a low engine load operation may be reduced effectively, and during the operation within the range with relatively high engine load (i.e., the middle operating range or the second operating range), under a condition with relatively rich fuel, a high torque according to the engine load may be secured.

Preferably, in this aspect of the present invention, within the first operating range, the CI combustion is performed by injecting the fuel from the injector during the intake stroke, and within the second operating range, the fuel injection by the injector and the spark-ignition by the ignition plug are performed in this order from a late stage of compression stroke to an early stage of expansion stroke, and the SI combustion is performed based on the fuel injection and the spark-ignition.

According to such a configuration, within the first operating range with relatively low engine load, the CI combustion is performed with the homogenous mixture gas based on the fuel injection during the intake stroke and the high heat release rate may be obtained. On the other hand, within the second operating range on the high engine load side, because the fuel injection and the spark-ignition are performed at the slightly late timings after the late stage of the compression stroke, the mixture gas combusts by the flame propagation after the in-cylinder temperature and pressure decrease to some extent after the compression TDC (SI combustion). Therefore, even if the geometric compression ratio of the engine is set significantly high so as to achieve the CI combustion within the low engine load range, the abnormal combustion which easily occurs within the high engine load range may surely be avoided.

According to the multi-cylinder gasoline engine of this embodiment with the above described configuration, both the securing of the ignitability when the CI combustion is performed within the low engine load range and the prevention of the abnormal combustion when performing the SI combustion within the high engine load range may be achieved.

DETAILED DESCRIPTION OF EMBODIMENT (1) Overall Configuration of Engine

Figure 1:
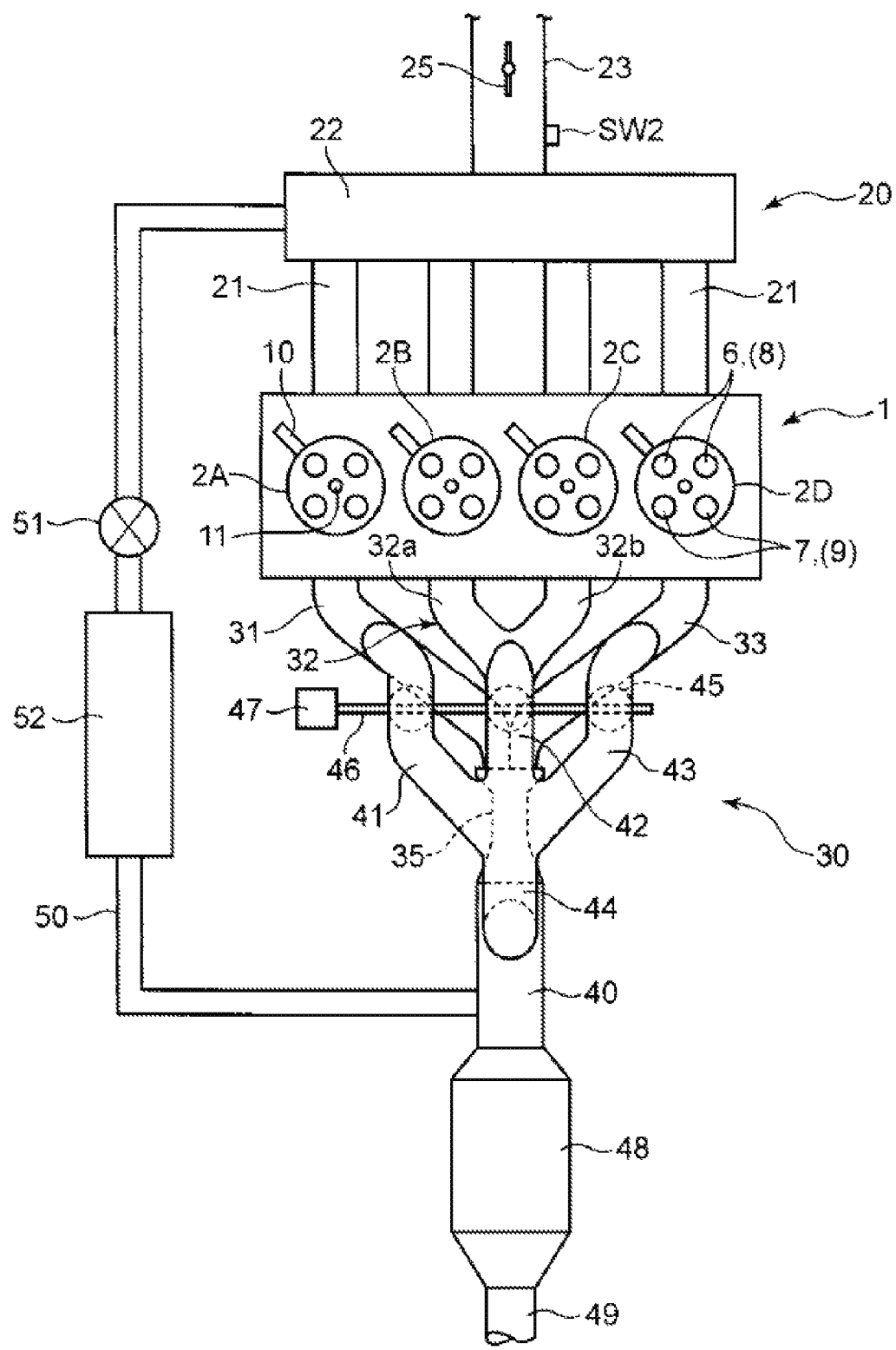
FIG. 1 is a plan view showing an overall configuration of a multi-cylinder gasoline engine according to one embodiment of the invention.
Figure 2:
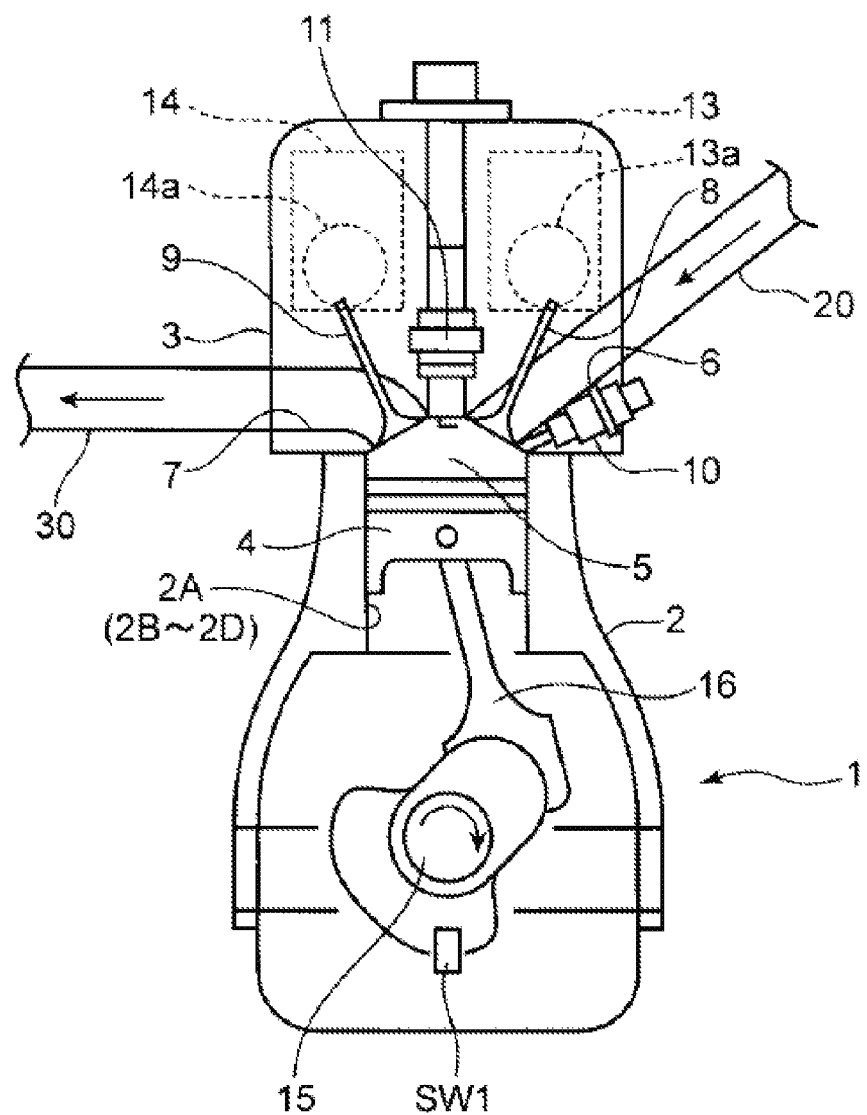
FIG. 2 is a cross-sectional view showing a configuration of an engine body of the engine.

FIGS. 1 and 2 are views showing a configuration of a multi-cylinder gasoline engine according to one embodiment of the present invention. The engine of this embodiment includes an engine body 1 of a four-cycle four-cylinder type having four cylinders 2A to 2D aligned in a specific direction, an intake manifold 20 for introducing air for combustion into the engine body 1, and an exhaust manifold 30 for discharging exhaust gas generated in each cylinder of the engine body 1.

The engine body 1 has a cylinder block 2 formed therein with the cylinders 2A to 2D, a cylinder head 3 provided on a top surface of the cylinder block 2, and pistons 4 reciprocatably inserted into the respective cylinders 2A to 2D.

Combustion chambers 5 are formed on the pistons 4, respectively. Fuel containing gasoline is supplied to each combustion chamber 5 by an injection from an injector 10 (described later). Moreover, the injected fuel is combusted within the combustion chamber 5, and the piston 4 is pushed down by an expansion force caused by the combustion and reciprocates in up-and-down directions.

The pistons 4 are coupled to a crankshaft 15 via respective connecting rods 14b, and the crankshaft 15 rotates about its central axis according to the reciprocating motion of the pistons 4.

In the cylinder block 2, an engine speed sensor SW1 for detecting a speed of the crankshaft 15 and a speed of the engine is provided.

In the cylinder head 3, a set of the injector 10 and an ignition plug 11 is provided to each of the cylinders 2A to 2D. The injector 10 injects the fuel (containing gasoline) toward the combustion chamber 5, and the ignition plug 11 ignites mixture gas of the fuel injected from the injector 10 and air by a spark discharge.

In each of the cylinders 2A to 2D, the injector 10 is formed with a plurality of holes in its tip part to serve as injection ports of the fuel, and is provided to be exposed in one side of the combustion chamber 5 from an intake side. Additionally, an injection pressure of the fuel to be injected from the injector 10 is set to be 30 MPa or above which is quite high for a gasoline engine.

An electrode for discharging a spark is provided in a tip part of the ignition plug 11, and is provided to be exposed in the combustion chamber 5 of each cylinder from above.

Here, a geometric compression ratio (a ratio between a combustion chamber volume when the piston 4 is at a bottom dead center (BDC) and a combustion chamber volume when the piston 4 is at a top dead center (TDC)) of the engine body 1 of this embodiment is set to be between 16:1 and 20:1 which is quite high for a gasoline engine. Such a high geometric compression ratio is set to improve a theoretical thermal efficiency and secure ignitability in a later-described CI combustion (compressed self-ignition combustion).

Additionally, in the four-cycle four-cylinder gasoline engine as this embodiment, the pistons 4 provided to the cylinders 2A to 2D move in the up-and-down directions with their phases different from each other by 180° in crank angle (180° CA). Therefore, corresponding to this, ignition timings of the cylinders 2A to 2D are also set to vary from each other by 180° CA. Specifically, when the cylinders 2A to 2D are numbered first to fourth, respectively, the ignition is performed in the order of the first cylinder 2A, the third cylinder 2C, the fourth cylinder 2D, and then the second cylinder 2B. Therefore, for example, when the first cylinder 2A is on expansion stroke, the third cylinder 2C, the fourth cylinder 2D, and the second cylinder 2B are on compression stroke, intake stroke, and exhaust stroke, respectively.

The cylinder head 3 is provided with intake ports 6 for introducing air supplied from the intake manifold 20 into the combustion chambers 5 of the cylinders 2A to 2D; intake valves 8 for opening and closing the intake ports 6; exhaust ports 7 for discharging the exhaust gas generated in the combustion chambers 5 of the cylinders 2A to 2D to the exhaust manifold 30; and exhaust valves 9 for opening and closing the exhaust ports 7. Note that, the engine in the drawings is a so called double overhead camshaft (DOHC) engine in which two intake valves 8 and two exhaust valves 9 are provided in each cylinder.

The intake and exhaust valves 8 and 9 are opened and closed in conjunction with the rotation of the crankshaft 15 by valve systems 13 and 14 shown in FIG. 2 that include a pair of camshafts arranged in the cylinder head 3.

The valve system 13 for the intake valves 8 incorporates a variable mechanism 13a that can change lifts of the intake valves 8 continuously (in a non-step manner). The variable mechanism 13a with such a configuration has already been well known as, for example, a continuously variable valve lift mechanism (CVVL), and particular examples include a configuration which includes a link mechanism for reciprocating and oscillating, in conjunction to the rotation of the camshaft, cams for operating the intake valves 8, a control arm for variably setting an arrangement of the link mechanism (lever ratio), and a stepper motor for changing oscillating amounts of the cams (amounts and periods of pushing down the intake valves 8) by electrically operating the control arm.

The valve system 14 for the exhaust valves 9 incorporates a switch mechanism 14a for validating or invalidating a function of pushing down the exhaust valves 9 on the intake stroke. Note that, the switch mechanism 14a can open the exhaust valves 9 not only on the exhaust stroke but also on the intake stroke, and it also has a function of switching a mode between performing and stopping the opening operation of the exhaust valves 9 on the intake stroke (i.e., the open-twice control of the exhaust valve 9).

The switch mechanism 14a with such a configuration has already been well known, and particular examples include a configuration which includes sub cams for pushing down the exhaust valves 9 on the intake stroke separately to normal cams for operating the exhaust valves 9 (cams for pushing down the exhaust valves 9 on the exhaust stroke), and a so called lost motion mechanism for validating or invalidating the transmission of a drive force of each sub cam to the exhaust valve 9.

When the push down of the exhaust valve 9 by the sub cam of the switch mechanism 14a is validated, the exhaust valve 9 is opened not only on the exhaust stroke but also on the intake stroke (a lift of the exhaust valve 9 is increased again on the intake stroke), and therefore, an internal EGR in which the high temperature exhaust gas flows back from the exhaust port 7 to the combustion chamber 5 is achieved and a temperature of the combustion chamber 5 is increased, as well as an amount of air (fresh air) to be introduced into the combustion chamber 5 is reduced.

On the other hand, when the push down of the exhaust valve 9 by the sub cam of the switch mechanism 14a is invalidated, the exhaust valve 9 is only opened on the exhaust stroke and, therefore, the internal EGR is stopped.

Note that, here, the phrase "XX valve is opened on YY stroke," means that an open period (a period from when the valve starts to open until the valve closes) of the XX valve is set to mainly overlap with the YY stroke, and it does not necessarily mean the open period is entirely on the YY stroke. Therefore, for example, even if it is described that "the exhaust valve 9 is only opened on the exhaust stroke," to indicate the state where the exhaust valve 9 is prohibited to open the second time on (where the valve 9 is opened by the sub cam of the switch mechanism 14a), it does not necessarily mean that the open period of the exhaust valve 9 entirely settles on the exhaust stroke, but it may be that only a part of the open period of the exhaust valve 9 settles on the intake stroke.

As shown in FIG. 1, the intake manifold 20 includes a surge tank 22 connected with a downstream end part of a single intake pipe 23 and having a predetermined volume, and a plurality of (four) independent intake passages 21 coupling the surge tank 22 to the respective intake ports of the cylinders 2A to 2D.

An openable-and-closeable throttle valve 25 and an airflow sensor SW2 for detecting a flow rate of air (fresh air) to be sucked into the engine body 1 are provided in an intermediate part of the intake pipe 23.

Figure 3:
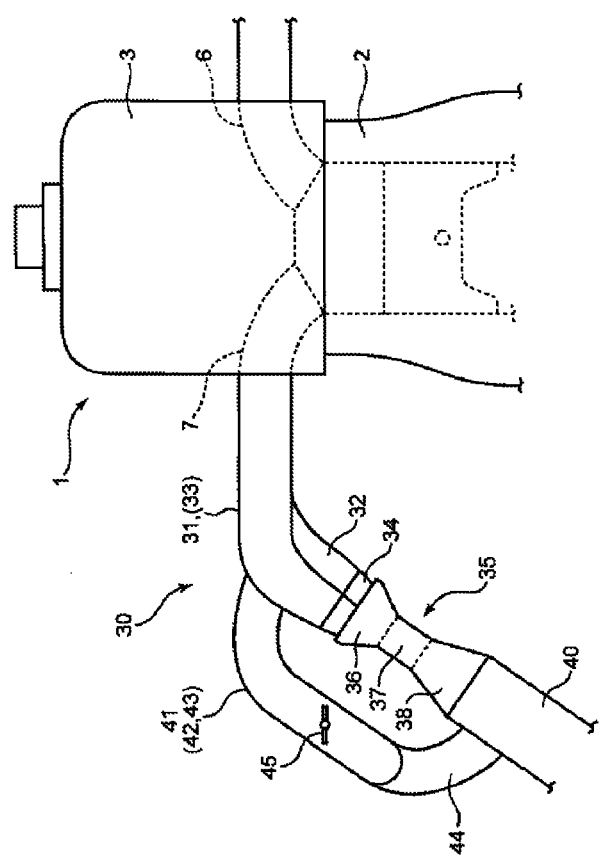
FIG. 3 is a side view showing a configuration of an exhaust manifold of the engine.
Figure 4:
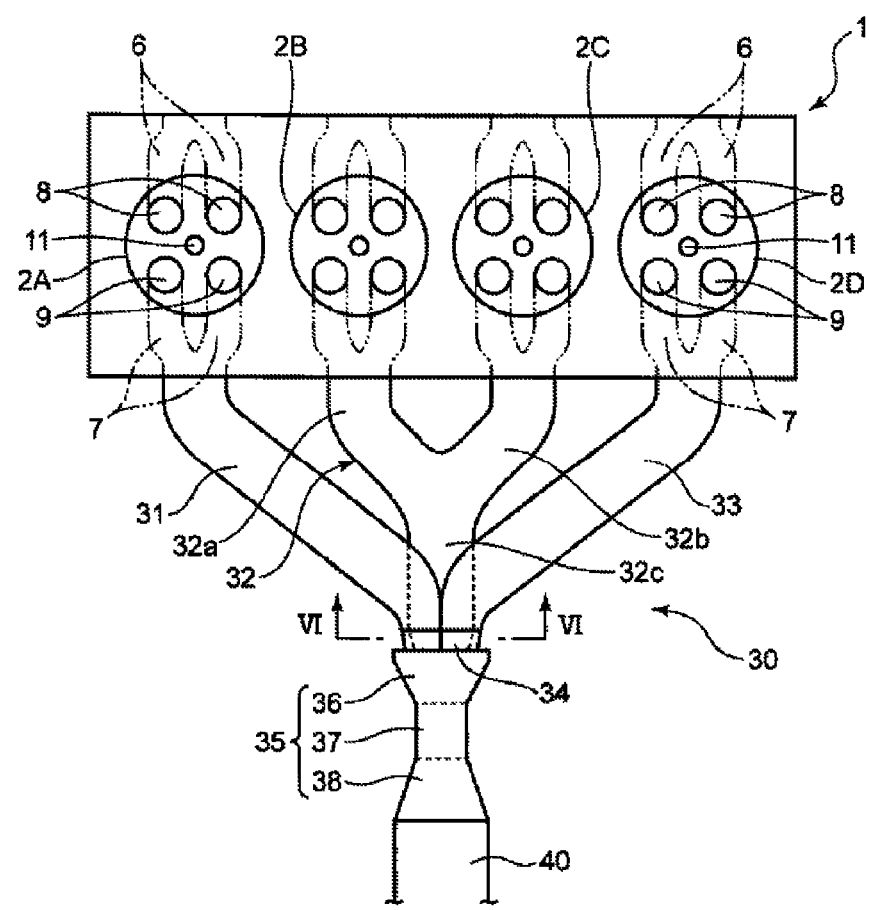
FIG. 4 is a plan view particularly showing a configuration of independent exhaust passages provided to the exhaust manifold.
Figure 5:
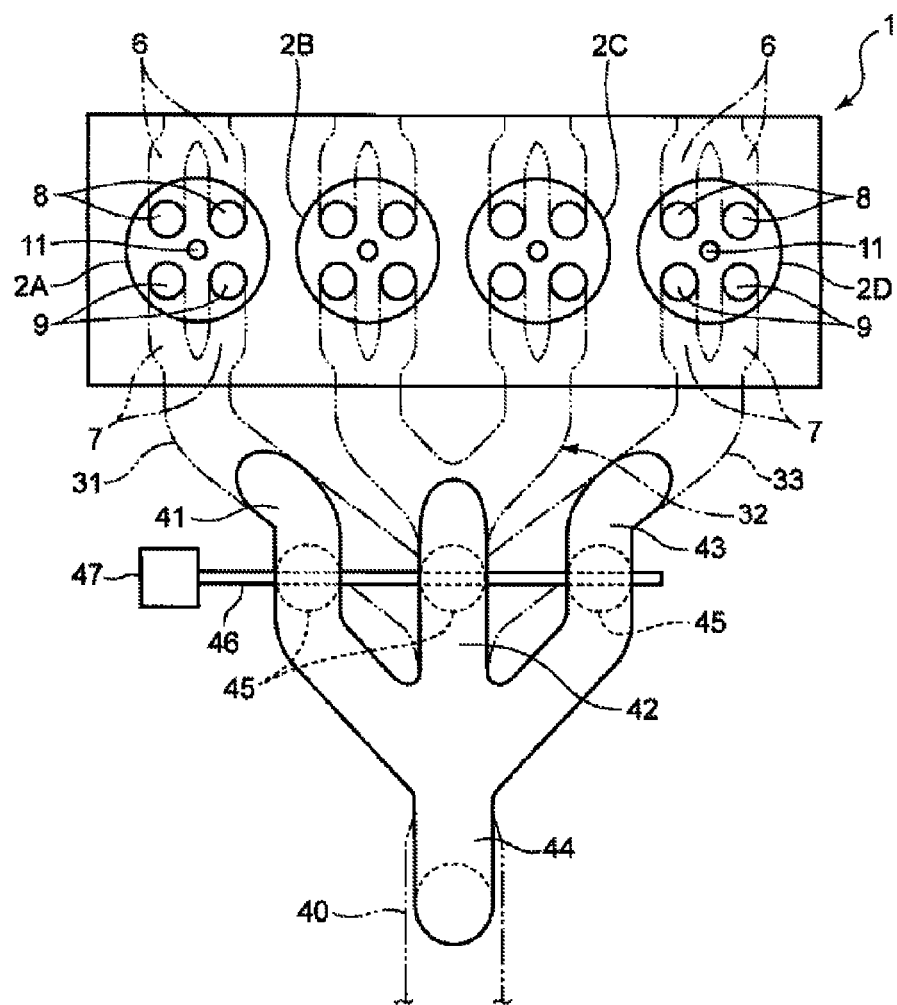
FIG. 5 is a plan view particularly showing a configuration of a bypass passage provided to the exhaust manifold.

FIGS. 3 to 5 are views showing the structure of the exhaust manifold 30 in detail. As shown in FIGS. 1, and 3 to 5, the exhaust manifold 30 includes a plurality of independent exhaust passages 31, 32, and 33 of which upstream end parts are connected with the respective exhaust ports 7 of the cylinders 2A to 2D, a gathering section 34 where downstream end parts of the independent exhaust passages 31 to 33 (end parts on the opposite side to the engine body 1) are bundled so that the passages are adjacent to each other while maintaining the independent state, a negative pressure generating device 35 provided on a downstream side of the gathering section 34 and formed therein with a common space communicating with all the independent exhaust passages 31 to 33, and a single exhaust pipe 40 connected on the downstream side of the negative pressure generating device 35. A catalytic converter 48 built therein with a catalyst, such as a three-way catalyst, is provided on the downstream side of the exhaust pipe 40, and on the further downstream side thereof, an exhaust pipe 49 and a silencer (not illustrated) are provided, for example. Note that, for the sake of convenience, for example, the independent exhaust passages 31 to 33 are indicated by virtual lines in FIG. 5, and bypass passages 41 to 43 and a bypass downstream part 44 (described later) are omitted in FIG. 4.

As shown in FIGS. 1 and 4, in this embodiment, the three independent exhaust passages 31 to 33 are arranged for the four cylinders 2A to 2D. This is because the independent exhaust passage 32 arranged in the center is branched into a Y-shape so that it can be used commonly for the second cylinder 2B and the third cylinder 2C. Thus, the independent exhaust passage 32 has two branched passage sections 32a and 32b extending from the respective exhaust ports 7 of the second cylinder 2B and the third cylinder 2C and merging with each other on the downstream side thereof, and a single common passage section 32c extending further downward from the section where the branched passage sections 32a and 32b merge together. On the other hand, the independent exhaust passages 31 and 33 connected with the exhaust ports of the first cylinder 2A and the fourth cylinder 2D, respectively, have a singular pipe form without branches. Note that, hereinafter, the independent exhaust passages 31 and 33 in the singular pipe form may be referred to as "the first independent exhaust passage 31" and "the third independent exhaust passage 33," and the binary-branched independent exhaust passage 32 may be referred to as "the second independent exhaust passage 32."

As described above, in the four-cycle four-cylinder engine as this embodiment, the ignition is performed in the order of the first cylinder 2A, the third cylinder 2C, the fourth cylinder 2D, and then the second cylinder 2B. Thus, the exhaust order (the order of the exhaust stroke execution) of the second cylinder 2B and the third cylinder 2C to which the upstream end parts of the binary-branched second independent exhaust passage 32 are connected, respectively, is not continuous. Therefore, even when the common independent exhaust passage 32 is connected with the second cylinder 2B and the third cylinder 2C as this embodiment, the exhaust gas from both the cylinders 2B and 2C does not flow into the independent exhaust passage 32 simultaneously.

The first and third independent exhaust passages 31 and 33 having the singular pipe form extend toward the center of the engine in the cylinder arranging direction so that positions of their downstream end parts match with a downstream end part of the second independent exhaust passage 32. Thus, as particularly shown in FIG. 4, the downstream end part of the first independent exhaust passage 31, the downstream end part of the common passage section 32c of the second independent exhaust passage 32, and the downstream end part of the third independent exhaust passage 33 are bundled at one position which is separated downstream from the center of a wall surface of the engine body 1 on the exhaust side (corresponding to a position between the second cylinder 2B and the third cylinder 2C in a top view). Moreover, the gathering section 34 is formed by the downstream end parts of the three independent exhaust passages 31 to 33 which are bundled, and, for example, a holding member for holding the passages in the bundled state.

Figure 6:
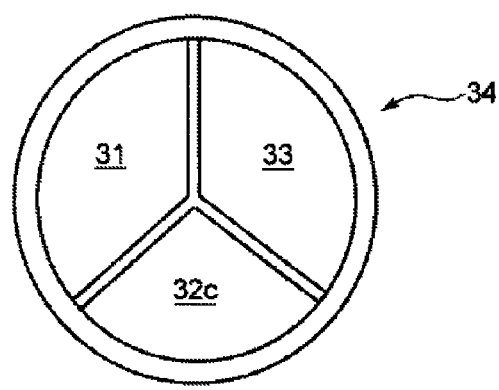
FIG. 6 is a cross-sectional view taken along a line VI-VI in FIG. 5.

As shown in FIG. 6, each of the downstream end parts of the independent exhaust passages 31 to 33, in other words, each of the downstream end parts of the first independent exhaust passage 31, the downstream end part of the common passage section 32c of the second independent exhaust passage 32, and the downstream end part of the third independent exhaust passage 33, has a fan-shaped cross-section corresponding to one-third of a whole circle. Thus, by gathering the three downstream end parts having such cross-sections, the gathering section 34 having a substantially circle shape is formed as a whole.

The downstream end parts of the independent exhaust passages 31 to 33 arranged adjacently to each other in the gathering section 34 are formed into a nozzle of which a passage cross-sectional area becomes smaller downstream (see FIGS. 3 and 4). Therefore, the exhaust gas passing through the downstream end parts of the independent exhaust passages 31 to 33 accelerates (in flow velocity) therein, and then is discharged to the negative pressure generating device 35.

Additionally, the downstream end parts of the independent exhaust passages 31 to 33 are bundled in the gathering section 34 in angles comparatively close to be in parallel to each other. Specifically, the downstream end parts of the independent exhaust passages 31 to 33 are arranged so that each angle between axes thereof is as narrow as, for example, around 10°.

As shown in FIGS. 3 and 4, the negative pressure generating device 35 has, from the upstream side, a nozzle part 36 formed to have smaller passage cross-sectional area toward downstream, a straight part 37 formed to have a substantially constant passage cross-sectional area, and a diffuser part 38 formed to have a larger passage cross-sectional area toward downstream. Therefore, the exhaust gas discharged from the downstream end part of any one of the independent exhaust passages 31 to 33 first flows into the nozzle part 36, and further accelerates (here, the pressure of the exhaust gas decreases). Additionally, the accelerated exhaust gas by the nozzle part 36 decelerates as it passes through the straight part 37 and the diffuser part 38, and accordingly, the pressure of the exhaust gas is restored.

When the exhaust gas is discharged at high speed from the downstream end parts of any one of the independent exhaust passages 31 to 33 toward the nozzle part 36, a negative pressure section where the pressure is relatively low is created around the discharge gas. Therefore, when the exhaust gas is discharged from the independent exhaust passage (any one of 31 to 33) of any one of the cylinders to the negative pressure generating device 35, the negative pressure acts on, for example, other independent passage(s) of the other cylinder (s), and the exhaust gas is sucked downstream therefrom. This is known as an ejector effect.

Note that, when an equivalent circle diameter of an area of a downstream end part of the nozzle part 36 (same as the area of the straight part 37) is "D," and an equivalent circle diameter of the downstream end parts of the independent exhaust passages 31 to 33 is "a," a sufficient ejector effect can be obtained if a/D≥0.5. Therefore, in this embodiment, a/D is set to be 0.5 or above (e.g., 0.65). Here, an equivalent circle diameter is a diameter of a true circle formed by converting a cross-section having a certain shape of which an area is the same as that of the true circle.

As shown in FIGS. 1, 3 and 5, the exhaust manifold 30 of this embodiment further includes three bypass passages 41 to 43 branched to extend from the respective intermediate parts of the independent exhaust passages 31 to 33 and merging together on the downstream side, and a bypass downstream part 44 extending downstream from the section where the bypass passages 41 to 43 merge together. A downstream end portion of the bypass downstream part 44 is connected with the exhaust pipe 40 serving as an exhaust passage positioned downstream of the negative pressure generating device 35. Thus, the bypass passages 41 to 43 couple the respective intermediate parts of the independent exhaust passages 31 to 33 (the parts positioned upstream of the negative pressure generating device 35) to the exhaust pipe 40. Note that, an angle from which each of the bypass passages 41 to 43 merges is set to be a comparatively large angle, for example, an intersecting angle between axes of the bypass passages 41 and 42, and an intersecting angle between axes of the bypass passages 42 and 43 are set to be 30° or above.

Each of the bypass passages 41 to 43 and the bypass downstream part 44 is formed to have a substantially constant cross-sectional area from its upstream end to downstream end, and the cross-sectional area is set to be larger than each of the cross-sectional areas of the downstream parts of the independent exhaust passages 31 to 33. In this embodiment, the cross-sectional areas of the bypass passages 41 to 43 and the bypass downstream part 44 are set substantially the same as the circle cross-sectional area of the circle of the gathering section 34 formed by gathering the downstream end parts of the independent exhaust passages 31 to 33 (the total area of the downstream end parts of the passages 31 to 33).

Openable-and-closeable flow switch valves 45 are provided inside the bypass passages 41 to 43, respectively. The flow switch valves 45 are provided to turn centering on a common rod 46, and one end of the rod 46 is coupled to an actuator 47. Moreover, when the rods 46 turn by an operation of the actuator 47, the flow switch valves 45 are simultaneously operated to open or close the bypass passages 41 to 43.

The flow switch valves 45 which operate as described above are each used to switch a mode between allowing and interrupting the exhaust gas discharged from any of the cylinders 2A to 2D to reach the negative pressure generating device 35. For example, when the flow switch valve 45 is fully closed, the entire exhaust gas discharged from any of the cylinders 2A to 2D passes the respective independent exhaust passages 31 to 33 and flows into the negative pressure generating device 35. Thus, a large negative pressure (negative pressure with which a pressure is sufficiently reduced) is generated inside the negative pressure generating device 35, and a sufficient suction action of the exhaust gas (ejector effect) can be obtained. On the other hand, when the flow switch valve 45 is fully opened, a major part of the exhaust gas discharged from the cylinders 2A to 2D flows downstream through the bypass passages 41 to 43, and flows into the exhaust pipe 40 positioned further downstream thereof without passing through the negative pressure generating device 35. In this manner, the negative pressure is not generated in the negative pressure generating device 35, and thus, the ejector effect significantly degrades. Note that, the reason why the major part of the exhaust gas passes through the bypass passages 41 to 43 (and not the independent exhaust passages 31 to 33) when the flow switch valve 45 is fully opened is because the bypass passages 41 to 43 have larger cross-sectional areas and less flow resistance than those of the downstream end parts of the independent exhaust passages 31 to 33.

As shown in FIG. 1, the exhaust pipe 40 of the exhaust manifold 30 and the surge tank 22 of the intake manifold 20 are coupled to each other via an EGR passage 50. An intermediate part of the EGR passage 50 is provided with an openable-and-closeable EGR valve 51, and an EGR cooler 52 configured with a heat exchanger using, for example, a coolant of the engine.

The EGR passage 50 is used to recirculate a part of the exhaust gas passing through the exhaust manifold 30 to the intake manifold 20. Specifically, when the EGR valve 51 is opened, a part of the exhaust gas flowing in the exhaust pipe 40 passes through the EGR passage 50 and is led back to the surge tank 22. Here, the exhaust gas is cooled by the EGR cooler 52, and therefore, a temperature of the exhaust gas when flowing into the surge tank 22 is significantly lower than that of when passing through the exhaust manifold 30. The low temperature exhaust gas led back to the surge tank 22 passes through the independent intake passages 21 and is again introduced into the cylinders 2A to 2D. Note that, hereinafter, the recirculation operation of the exhaust gas through the EGR passage 50 is referred to as "the external EGR" (External Exhaust Gas Recirculation) so as to differentiate it from the flowback operation of the exhaust gas by the open-twice control of the exhaust valve 9 (internal EGR) as described above.

On the other hand, when the EGR valve 51 is fully closed, the exhaust gas does not flow from the exhaust pipe 40 to the EGR passage 50 and the external EGR is prohibited.

(2) Control System

Figure 7:
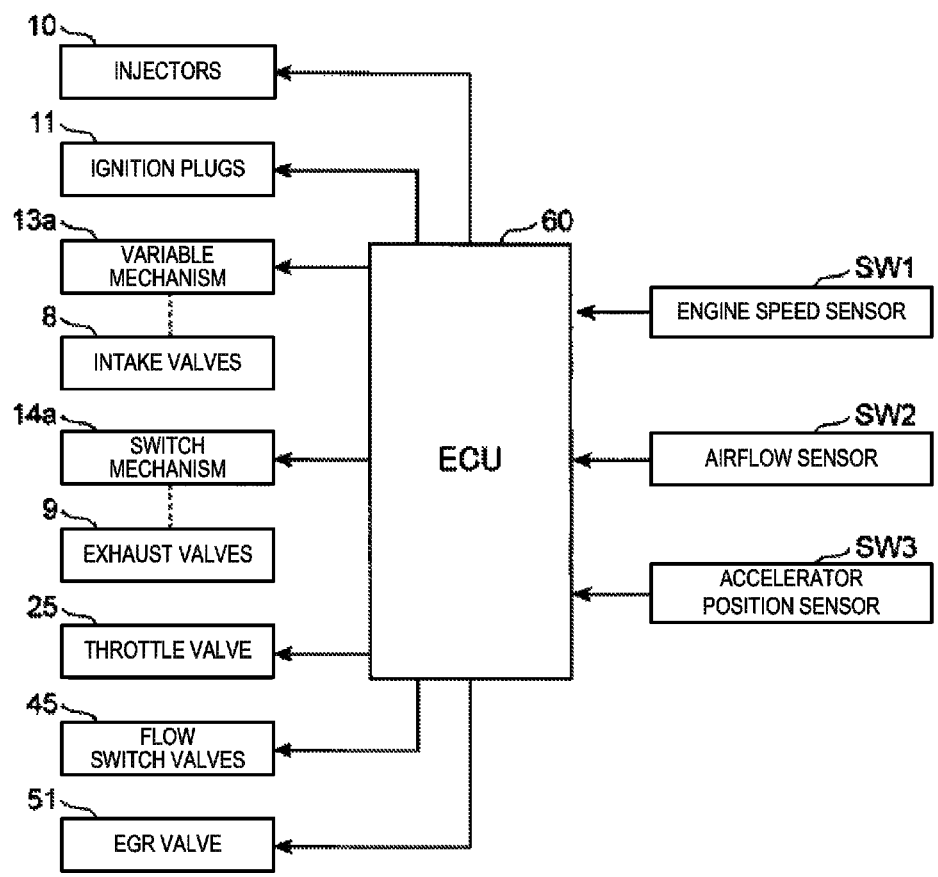
FIG. 7 is a block diagram showing a control system of the engine.

Next, a control system of the engine is described with reference to FIG. 7. The engine configured of this embodiment is mounted on a vehicle, such as an automobile, and is controlled by an ECU 60 (Engine Control Unit) provided to the vehicle. The ECU 60 is, as is well-known, a micro processor configured with, for example, a CPU, a ROM, a RAM, and corresponds to a controller in the claims.

The ECU 60 is inputted with information from various sensors. For example, the ECU 60 is electrically connected with the engine speed sensor SW1 and the airflow sensor SW2 provided in the engine, and receives input signals from the sensors (information on engine speed and intake air flow rate). Moreover, an accelerator position sensor SW3 for detecting an angle of an acceleration pedal controlled by a driver (not illustrated) is provided in the vehicle, and the detected signal by the accelerator position sensor SW3 is also inputted to the ECU 60.

The ECU 60 controls respective components of the engine while performing various calculations based on the input signals from the sensors (e.g., SW1 to SW3). Specifically, the ECU 60 is electrically connected with, for example, the injectors 10, the ignition plugs 11, the variable mechanism 13a, the switch mechanism 14a, the flow switch valve 45 (the actuator 47 for valve operation to be exact), the throttle valve 25, and the EGR valve 51. The ECU 60 outputs drive control signals to these components based on, for example, the result of the calculations.

Figure 8:
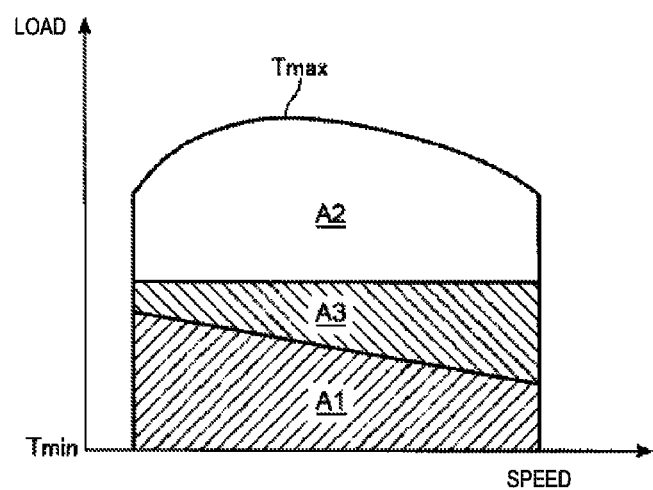
FIG. 8 is a chart conceptually showing a control map used in an operation of the engine.

FIG. 8 is a chart conceptually showing a control map referred to by the ECU 60 during an engine operation. In this control map, an engine operating range is divided into three ranges: a first operating range A1, a second operating range A2, and a middle operating range A3, in which the first operating range A1 is set as a lowest engine load range containing a lowest engine load Tmin, and the second operating range A2 is set as a highest engine load range containing a highest engine load Tmax. Moreover, the middle operating range A3 is set as an engine load range between the first and second operating ranges A1 and A2. During the engine operation, the ECU 60 consecutively determines an operating range where the engine is currently operated in the map in FIG. 8 based on respective values of the engine load (a required torque based on the accelerator position) and the engine speed, and the ECU 60 controls the injectors 10, the ignition plugs 11, the variable mechanism 13a, the switch mechanism 14a, the flow switch valve 45, the throttle valve 25, and the EGR valve 51.

(3) Control within Each Operating Range

Next, contents of combustion controls within the operating ranges A1, A2 and A3 shown in FIG. 8 are described. In this embodiment, as described in detail later, an SI combustion in which the mixture gas is combusted by flame propagation using a forcible ignition caused by a spark discharge from the ignition plug 11 as a trigger is performed within the second operating range A2, which is the highest engine load range, and a CI combustion in which the mixture gas self-ignites by a compression action of the piston 4 is performed within the first and middle operating ranges A1 and A3 which are on the lower engine load side of the second operating range A2.

(i) First Operating Range A1

Figure 9:
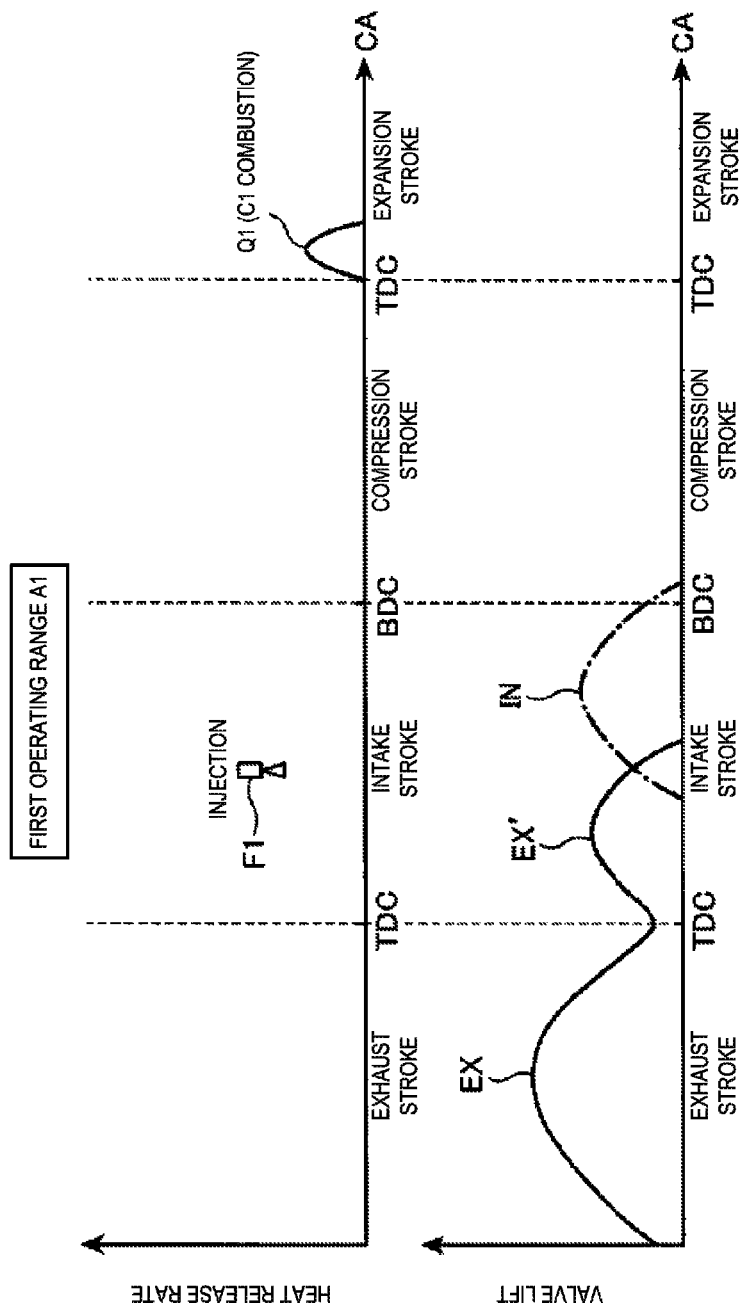
FIG. 9 shows charts illustrating a fuel injection and closing/opening operations of intake and exhaust valves performed within a first operating range, in relation to a crank angle.

First, the combustion control within the first operating range A1 set as the lowest engine load range containing the lowest engine load Tmin is described with reference to FIGS. 9 and 12. FIG. 9 shows charts illustrating the fuel injection and closing/opening operations of the intake and exhaust valves performed within the first operating range A1, in relation to a crank angle CA. FIG. 12 shows charts illustrating changes of a component ratio of filling gas into the cylinder and various control parameters according to a change of the engine load. Note that, in FIG. 11, "EX" indicates a lift curve of the exhaust valve 9 which opens on the exhaust stroke, "EX'" indicates a lift curve of the exhaust valve 9 which opens on the intake stroke, and "IN" indicates a lift curve of the intake valve 8. Additionally, in FIG. 12, a border load between the first and middle operating ranges A1 and A3 is indicated as "T1," a border load between the middle and second operating ranges A3 and A2 is indicated as "T2," and loads to serve as thresholds for starting and ending a control are indicated as "Tx" and "Ty," respectively.

As shown in FIG. 9, within the first operating range A1, the CI combustion is performed in which the mixture gas formed in the combustion chamber 5 based on a fuel injection F1 from the injector 10 self-ignites by the compression action of the piston 4. Specifically, within the first operating range A1, a comparatively small amount of fuel is injected from the injector 10 at a predetermined timing on the intake stroke (fuel injection F1) to form homogeneous lean mixture gas in which the fuel and air (fresh air) are mixed, in the combustion chamber 5 based on the fuel injection F1. The mixture gas is increased in temperature and pressure by the compression action of the piston 4 on the exhaust stroke, and self-ignites near a compression TDC (TDC between the compression stroke and the exhaust stroke). Thus, the CI combustion accompanied by a heat release as indicated by the waveform Q1 occurs based on such a self-ignition.

In order to stimulate such a CI combustion caused by the self-ignition of the mixture gas, within the first operating range A1, as shown in FIGS. 9 and 12, the open/close mode of the exhaust valve 9 is set to the open-twice mode, and thus, the switch mechanism 14a is controlled to open the exhaust valve 9 not only on the exhaust stroke but also on the intake stroke. Thus, by also opening the exhaust valve 9 on the intake stroke, the internal EGR in which the exhaust gas flows back into the cylinder from the exhaust port 7 is performed, and the in-cylinder temperature is increased.

Moreover, within the operating range A1, as shown in FIG. 12, an opening of the flow switch valve 45 is fully opened (100%). In this manner, most of the exhaust gas discharged from the cylinders 2A to 2D passes through the bypass passages 41 to 43, bypasses the negative pressure generating device 35, and flows downstream into the exhaust pipe 40.

The lift of the intake valve 8 within the operating range A1 is controlled in the following pattern based on the operation of the variable mechanism 13a to change the lift. Thus, within the first operating range A1, within a range where the engine load is below Tx (extreme low engine load range), the lift of the intake valve 8 is set to a minimum amount; on the other hand, within a range with higher engine load than Tx, the lift of the intake valve 8 is increased as the engine load becomes higher. In this manner, an amount of fresh air to be introduced into the cylinder from the intake port 6 within the first operating range A1 reaches a smallest amount below the predetermined engine load Tx, and is increased as the engine load becomes higher above the predetermined engine load Tx.

Meanwhile, an amount of the exhaust gas to be introduced into the cylinder by the internal EGR (internal EGR gas) reaches, contrary to the change of the fresh air amount, the largest amount below the predetermined engine load Tx, and is reduced as the engine load becomes higher above the predetermined engine load Tx.

An opening of the EGR valve 51 within the first operating range A1 is fully closed (0%) within the range below the predetermined engine load Tx; on the other hand, within the range with higher engine load, the opening is increased as the engine load becomes higher. Specifically, by fully closing the EGR valve 51 within the range below the predetermined engine load Tx, the external EGR, in other words the operation of recirculating the exhaust gas which is discharged to the exhaust manifold 30 once, into the cylinder through the EGR passage 50 is prohibited. On the other hand, within the range with higher engine load than the predetermined engine load Tx, by gradually opening the EGR valve 51, an amount of the exhaust gas to be recirculated by the external EGR (external EGR gas) is gradually increased.

An opening of the throttle valve 25 (throttle opening) is fixed to be fully opened (100%) within all the operating ranges including the first operating range A1 (ranges A1 to A3). However, within the first operating range A1, because the control of the lift of the intake valve 8, the internal EGR, and the external EGR are performed as described above, the fresh air amount is significantly reduced, and a state where a large part of the in-cylinder gas is the EGR gas (the internal EGR gas and the external EGR gas) is created. Because the large amount of EGR gas is introduced into the cylinder in addition to fresh air as described above, within the first operating range A1, a ratio of the gas and air with the fuel (G/F) obtained from dividing a mass of the entire gas to be filled in the cylinder (fresh air and the EGR gas) by a mass of the fuel is set to be 30:1 or above.

(ii) Middle Operating Range A3

Figure 10:
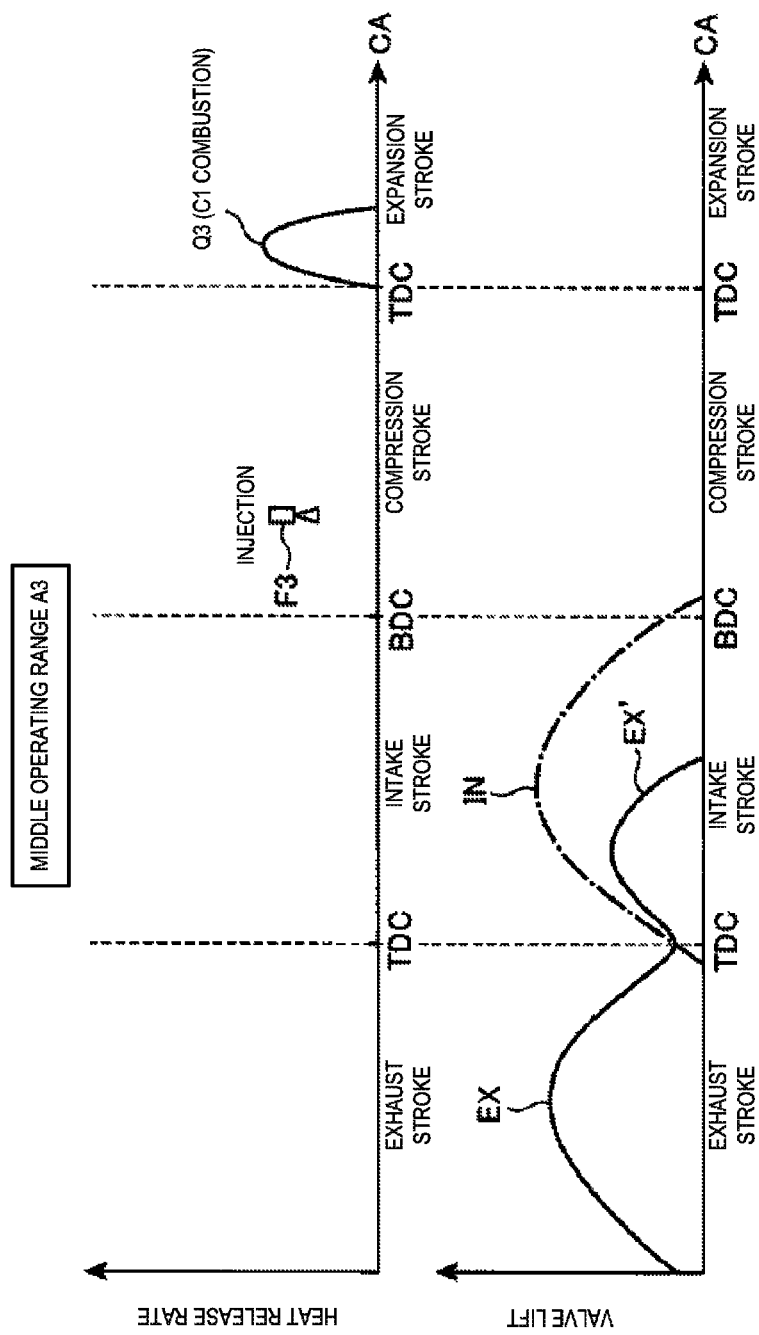
FIG. 10 shows charts illustrating a fuel injection and the closing/opening operations of the intake and exhaust valves performed within a middle operating range, in relation to the crank angle.

Within the middle operating range A3 with higher engine load than the first operating range A1, as shown in FIG. 10, the CI combustion in which the mixture gas formed in the combustion chamber 5 based on a fuel injection F3 from the injector 10 self-ignites by the compression action of the piston 4 is performed (waveform Q3). Note that, within the middle operating range A3, the fuel injection F3 is performed at a timing later than within the first operating range A1 with relatively low engine load, for example, at a predetermined timing on the compression stroke. The fuel injection timing is retarded within the middle operating range A3 with higher engine load (and thus, larger fuel injection amount) than the first operating range A1 because, if the fuel is injected at the similar timing to the first operating range A1, the mixture gas self-ignites too early, and an abnormal combustion and an excessive combustion noise may be caused.

As shown in FIGS. 10 and 12, the open/close mode of the exhaust valve 9 within the middle operating range A3 is, same as the first operating range A1, the open-twice mode in which the exhaust valve 9 is opened not only on the exhaust stroke but also on the intake stroke. In this manner, the internal EGR in which the exhaust gas flows back into the cylinder from the exhaust port 7 is achieved. Note that, the internal EGR gas amount within the middle operating range A3 (FIG. 12) is reduced as the engine load is increased by the opening control of the flow switch valve 45.

Specifically, within the middle operating range A3, the opening of the flow switch valve 45 is reduced as the engine load is increased. In this manner, the exhaust gas amount which flows into the bypass passages 41 to 43 is reduced, but the exhaust gas amount which flows into the negative pressure generating device 35 through the independent exhaust passages 31 to 33 is increased. This leads to a larger negative pressure generated in the negative pressure generating device 35 and a decrease in internal EGR gas amount. In other words, when the negative pressure in the negative pressure generating device 35 is increased (when the pressure is reduced), the negative pressure reaches the exhaust port 7 through the independent exhaust passages 31 to 33 and the exhaust gas is sucked downstream, resulting in less occurrence of the phenomena in which the exhaust gas flows back into the cylinder from the exhaust port 7. Within the middle operating range A3, because the opening of the flow switch valve 45 is reduced as the engine load is increased, the suction action of the exhaust gas caused by the negative pressure generated in the negative pressure generating device 35 (ejector effect) is gradually intensified, resulting in a gradual decrease in internal EGR gas amount.

Within the middle operating range A3, the opening of the EGR valve 51 is set to a predetermined large opening, and a comparatively large amount of exhaust gas is recirculated into the cylinder as the external EGR gas through the EGR passage 50. Moreover, the variable mechanism 13a is controlled to have the largest lift of the intake valve 8.

(iii) Second Operating Range A2

Figure 11:
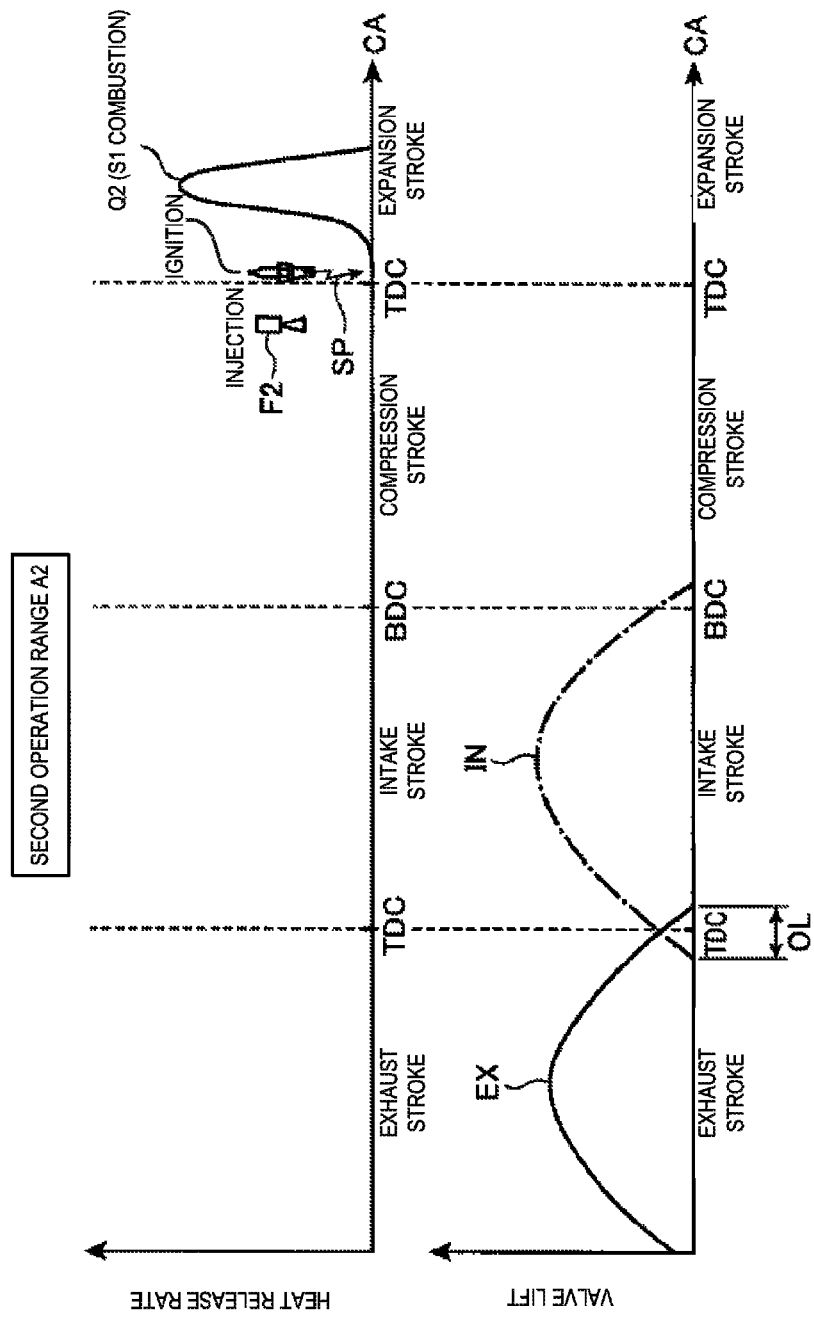
FIG. 11 shows charts illustrating a fuel injection and the closing/opening operations of the intake and exhaust valves performed within a second operating range, in relation to the crank angle.
Figure 12:
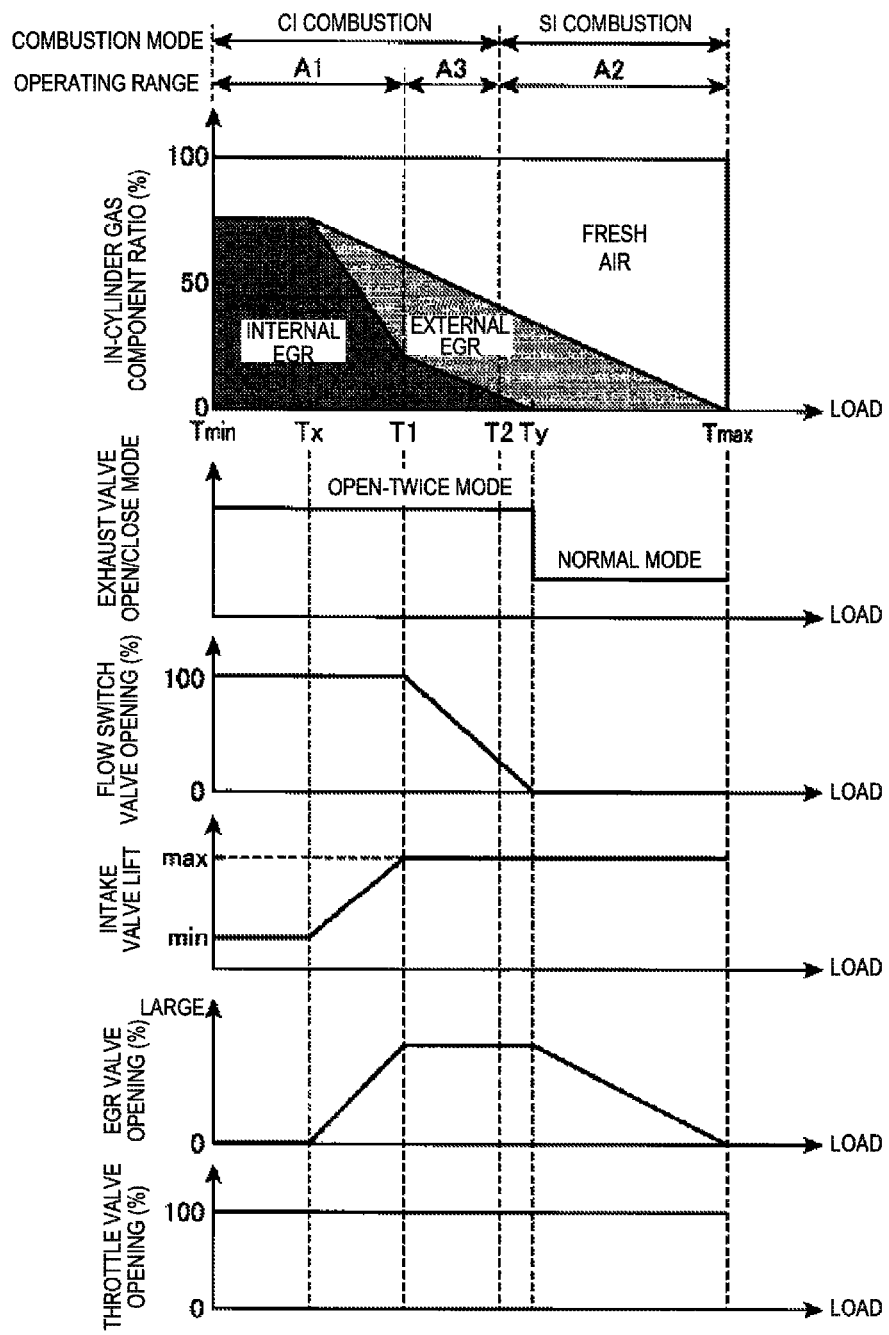
FIG. 12 shows charts illustrating changes of a component ratio of filling gas into a cylinder and various control parameters according to a change of an engine load.

Within the second operating range A2 with higher engine load than the middle operating range A3 and set as the range containing the highest engine load Tmax, the control as shown in FIG. 11 is performed. Specifically, the fuel is injected from the injector 10 at a comparatively late timing, such as in a late stage of the compression stroke (F2), and a spark-ignition SP is performed by the ignition plug 11 after the fuel injection F2 so that a control is performed which starts combusting the mixture gas by the flame propagation from a timing slightly after the compression TDC (early stage of expansion stroke).

The timing of starting the fuel injection F2 within the second operating range A2 is set to a suitable timing after the late stage of the compression stroke. Moreover, the timing of performing the spark-ignition SP within the range A2 is set to a suitable timing after a predetermined crank angle from the fuel injection F2. Specifically, the timing of the fuel injection F2 may be set to any between 20-0° CA BTDC (Before TDC), and the timing of the spark-ignition SP may be set to any between 0-20° CA ATDC (After TDC). Obviously, when the engine speed is particularly high or low, the fuel injection F2 and the spark-ignition SP may be performed out of the described crank angle range. Note that, the timings of the injection and ignition may be any timing within a range from the late stage of the compression stroke to the early stage of the expansion stroke (between 60° CA BTDC and 60° CA ATDC).

As shown in FIG. 12, the external EGR which recirculates the exhaust gas into the cylinder is performed within the second operating range A2 at least except the highest engine load Tmax. The amount of the exhaust gas recirculated by the external EGR (external EGR gas) is set less as the engine load becomes higher within the second operating range A2. Therefore, the opening of the EGR valve 51 within the second operation range A2 is basically reduced as the engine load becomes higher, and fully closed (0%) at the highest engine load.

Moreover, within the second operating range A2, the internal EGR is not performed basically. Therefore, the open/close mode of the exhaust valve 9 is set to a normal mode basically, and the switch mechanism 14a is controlled so that the exhaust valve 9 is only opened on the exhaust stroke. Additionally, the variable mechanism 13a is controlled to have the largest lift of the intake valve 8, and a predetermined overlap period, OL, between the late stage of the exhaust stroke and the early stage of the intake stroke in which both the intake and exhaust valves 8 and 9 open (FIG. 11) is secured.

Note that, in this embodiment, as shown in FIG. 12, the open/close mode of the exhaust valve 9 is set to the open-twice mode so that a small amount of internal EGR gas is introduced only within a part on the lower engine load side in the second operating range A2 (between the engine load T2 and Ty). Here, the opening of the flow switch valve 45 is set smaller than at the border between the middle operating range A3 and the second operating range A2 (engine load T2), and is fully closed (0%) at the engine load Ty slightly higher than the engine load T2. Thus, the entire exhaust gas discharged from the cylinders 2A to 2D flows into the negative pressure generating device 35, and therefore, a state where a large negative pressure is generated inside the negative pressure generating device 35 is created and the internal EGR gas amount is reduced to substantially zero. Such a state (a state where the internal EGR is stopped) lasts until the largest engine load Tmax.

As a result of controlling the external EGR and the internal EGR as described above, the fresh air amount within the second operating range A2 is increased as the engine load becomes higher, and during the engine operation at the largest engine load Tmax, the entire gas to be introduced into the cylinder substantially becomes fresh air.

Additionally, the injection amount by the fuel injection F2 is set to an amount with which an air excess ratio $\lambda$ inside the cylinder becomes 1:1, in other words, with which a value obtained from dividing a mass of fresh air inside the cylinder by the mass of the fuel becomes 14.7:1 (theoretical air fuel ratio). Note that, within the second operating range A2, as described above, the external EGR gas is introduced except at the largest engine load (the internal EGR gas is also introduced within a partial range on the low engine load side), and thus, the ratio of the gas and air with the fuel (G/F) obtained from dividing the mass of the entire gas inside the cylinder by the mass of the fuel becomes 14.7:1 or above (FIG. 12).

As shown in FIG. 11, the mixture gas at the theoretical air fuel ratio ($\lambda$=1:1) formed based on the fuel injection F2 starts to combust by flame propagation more rapid than normal, using the spark-ignition SP performed at a timing after a comparatively short period of time from the completion of the fuel injection F2 as a trigger, and as indicated by the waveform Q2, the combustion is completed before the late stage of the expansion stroke. Hereinafter, such an SI combustion performed within the second operating range A2 is referred to as "the rapid retard SI combustion." The method of achieving the rapid retard SI combustion within the second operating range A2 is as follows.

Figure 13:
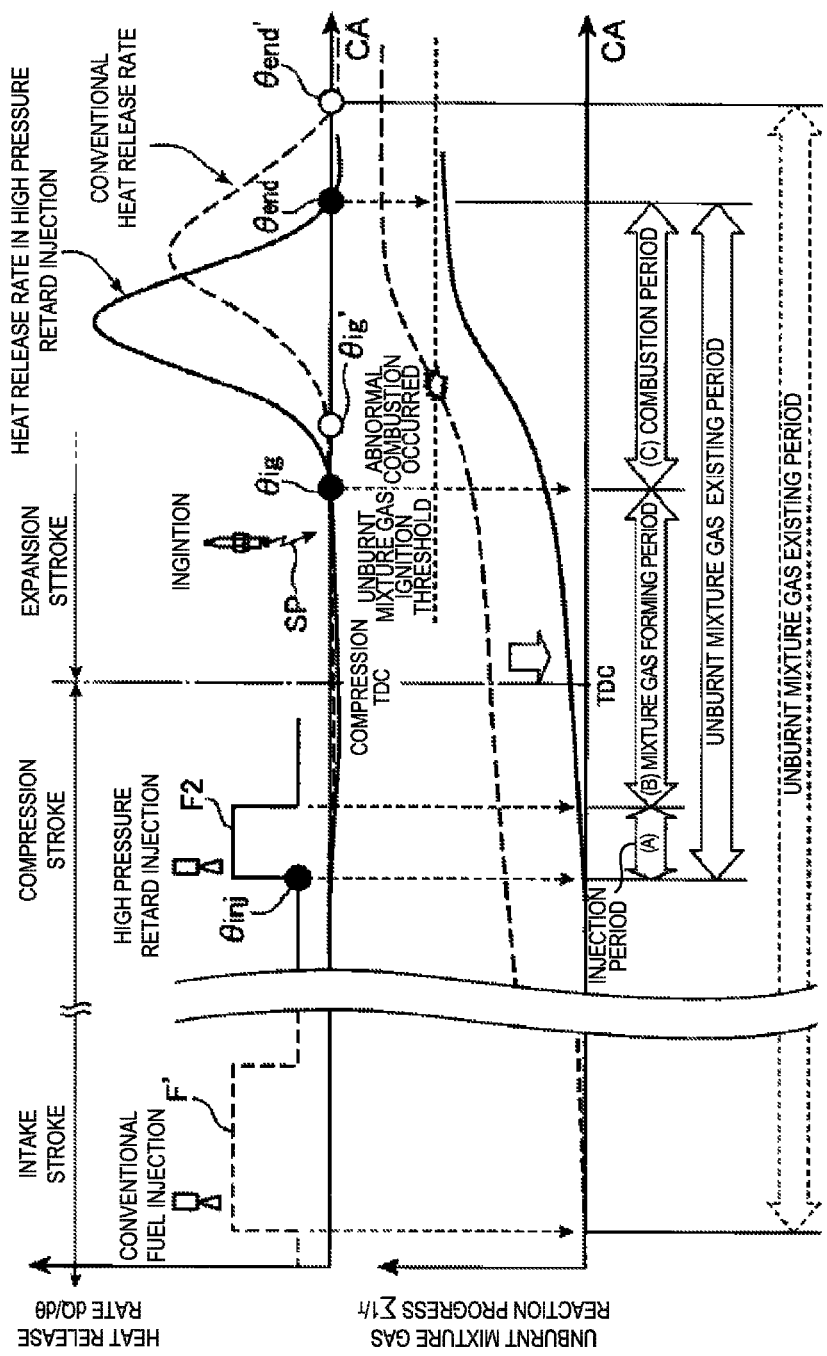
FIG. 13 shows charts for describing features of an SI combustion which is performed within the second operating range, in comparison to the conventional SI combustion.

FIG. 13 show charts for conceptually describing a difference in a heat release rate (upper chart) and a reaction progress of unburnt mixture gas (lower chart) between under the rapid SI combustion (solid line) and the conventional SI combustion in which the fuel injection is performed on the intake stroke (broken line). Note that the comparison is performed under the assumption that the geometric compression ratio of the engine is 18:1. Moreover, the engine load and speed are fixed and, therefore, the fuel injection amount is also fixed. Note that the pressure of the fuel injection is significantly higher in the rapid retard SI combustion than the conventional SI combustion (e.g., the injection pressure in the rapid retard SI combustion is 40 MPa and the conventional combustion is 7 MPa).

First, with the conventional SI combustion, a fuel injection F' is performed on the intake stroke. In the combustion chamber 5, after the fuel injection F', the sufficiently homogeneous mixture gas is formed before the piston 4 reaches the compression TDC. Moreover, here, the spark-ignition is performed at a slightly late timing after the compression TDC, and using the spark-ignition as the trigger (after a predetermined ignition delay period of time from the spark-ignition), the combustion by the flame propagation starts at a timing $\theta$ig'. Then, as indicated by the broken waveform in the upper chart of FIG. 13, the heat release rate reaches its peak at a timing after a predetermined period of time from the combustion start timing $\theta$ig', and at a timing $\theta$end' after a predetermined period of time therefrom, the combustion is completed.

Here, a period between the start of the fuel injection and the end of the combustion can be said that it is a period where the unburnt mixture gas may exist (existing period of the unburnt mixture gas). As indicated by the broken line in the lower chart of FIG. 13, the reaction of the unburnt mixture gas gradually progresses during the existing period of the unburnt mixture gas. With the conventional SI combustion, the existing period of the unburnt mixture gas is extremely long, and because the reaction of the unburnt mixture gas continues to progress during the period, there has been a problem that the abnormal combustion (i.e., knocking) in which the unburnt mixture gas self-ignites during the flame propagation after the spark-ignition occurs. Particularly, on a relatively low engine speed side where an actual period of time for the same crank angle change amount is relatively longer, the unburnt mixture gas reaction continues to progress and, therefore, the unburnt mixture gas progress exceeds an ignition threshold at a timing before the combustion start timing $\theta$ig' based on the spark-ignition (i.e., the unburnt mixture gas self-ignites regardless of the spark-ignition), resulting in causing a pre-ignition.

On the other hand, with the rapid retard SI combustion, as described above, the fuel is injected at an extremely high injection pressure as 30 MPa or above, within a period after the late stage of the compression stroke (e.g., 20-0° CA BTDC) which is significantly retarded (fuel injection F2). Such an injection with high pressure and late timing (hereinafter referred to as the high pressure retard injection) shortens the existing period of the unburnt mixture gas and leads to avoiding the abnormal combustion.

In other words, as shown in FIG. 13, the existing period of the unburnt mixture gas corresponds to a time length obtained by adding a period required in fuel injection from the injector 10 ((A) injection period), a period until burnable mixture gas is formed around the ignition plug 11 after the injection ends ((B) mixture gas formation period), and a period until the combustion triggered by the ignition ends ((C) combustion period), in other words, (A)+(B)+(C). The high pressure retard injection increases the injection amount per unit time, shortens time required in vaporizing the fuel and also increases a turbulence kinetic based on the fuel injection, and therefore, shortens the (A) injection period, (B) mixture gas formation period, and (C) combustion period, respectively. In this manner, the existing period of the unburnt mixture gas is significantly shortened, and thus, even under a condition where the compression ratio is high and the engine load is high, the unburnt mixture gas reaction progress is suppressed so that it does not exceed the ignition threshold before the combustion end timing, and the abnormal combustion is avoided. Additionally, with the rapid retard SI combustion, because the combustion period (C) is significantly shortened, even when if a combustion start timing $\theta$ig based on the spark-ignition is set to a timing retarded from the compression TDC to some extent (expansion stroke early stage) as the example in FIG. 13, the combustion occurring thereafter does not subside, and the heat release rate and the output torque are maintained well.

(4) Operation, Etc.

As described above, in this embodiment, the following characteristic configuration is adopted for the multi-cylinder gasoline engine operated by the fuel containing gasoline.

The exhaust manifold 30 of the engine includes the plurality of independent exhaust passages 31 to 33 of which the upstream end parts are connected with the exhaust ports 7 of one of the cylinders (2A or 2D) or the exhaust ports 7 of two of the cylinders where the exhaust order is not continuous therebetween (2B and 2D), the gathering section 34 where the downstream end parts of the independent exhaust passages 31 to 33 are bundled so that the passages are adjacent to each other while maintaining the independent state, the negative pressure generating device 35 provided on the downstream side of the gathering section 34 and formed with the nozzle part 36 formed to taper so that the negative pressure is generated due to the discharge of the exhaust gas from the downstream end parts of the independent exhaust passages 31 to 33, the bypass passages 41 to 43 extending by branching from the respective intermediate parts of the independent passages 31 to 33, merging on the downstream side, and communicating with the exhaust passage (exhaust pipe 40) positioned downstream of the negative generating device 35 via the bypass downstream part 44, and the openable-and-closeable flow switch valves 45 provided in the bypass passages 41 to 43.

Within the first operating range A1 with relatively low engine load, the CI combustion which is caused by the self-ignition of the mixture gas is performed. Moreover, within the first operating range A1, the switch mechanism 14a is controlled so that the exhaust valve 9 is not only opened on the exhaust stroke but also on the intake stroke (open-twice mode), and the flow switch valve 45 is opened so that the exhaust gas from the cylinders 2A to 2D bypasses the negative pressure generating device 35 through the bypass passages 41 to 43.

On the other hand, within the second operation A2 with higher engine load than the first operating range A1, the SI combustion which is forcibly caused by the spark-ignition is performed. Particularly, within the partial operating range on the high engine load side within the second operating range A2 (the range above the engine load Ty shown in FIG. 12), the switch mechanism 14a is controlled so that the exhaust valve 9 only opens on the exhaust stroke (normal mode), and the flow switch valve 45 is closed so that the exhaust gas from the cylinders 2A to 2D passes through the negative pressure generating device 35.

According to the multi-cylinder gasoline engine of this embodiment with the above described configuration, both the securing of the ignitability when the CI combustion is performed within the low engine load range and the prevention of the abnormal combustion when performing the SI combustion within the high engine load range can be achieved.

Specifically, in this embodiment, within the first operating range A1, by operating the exhaust valve 9 in the open-twice mode (the mode of opening on the intake stroke in addition to the exhaust stroke), the internal EGR in which the high temperature exhaust gas flows back into the cylinder (combustion chamber 5) from the exhaust ports 7 of the cylinders 2A to 2D is achieved, and as a result, the in-cylinder temperature is increased. In this manner, within the first operating range A1 where the engine load is low and the ignitability of the mixture gas is low, the self-ignition of the mixture gas is stimulated, resulting in an appropriate CI combustion. Additionally, within the first operating range A1, because the flow of the exhaust gas from the cylinders 2A to 2D is switched so that the exhaust gas passes through the bypass passages 41 to 43 (bypasses the negative pressure generating device 35), the ejector effect due to the generative pressure generated in the negative pressure generating device 35 (the downstream suction effect of the exhaust gas) is invalidated and, as a result, when the blowdown gas (exhaust gas discharged swiftly immediately after the exhaust valve 9 is opened) is discharged, a large positive pressure generated by the blowdown gas acts on the exhaust port 7 of a preceding cylinder of which the exhaust order is immediately before the cylinder, and inhibits the discharge of the exhaust gas (exhaust interference). In this embodiment, by operating the exhaust valve 9 in the open-twice mode in a state with purposely created exhaust interference, a large amount of exhaust gas flows back into the cylinder from the exhaust port 7, and the internal EGR gas amount can be increased. This becomes advantageous in increasing the in-cylinder temperature and leads to self-ignition stimulation of the mixture gas, resulting in surely triggering the CI combustion within the low engine load range.

Figure 14:
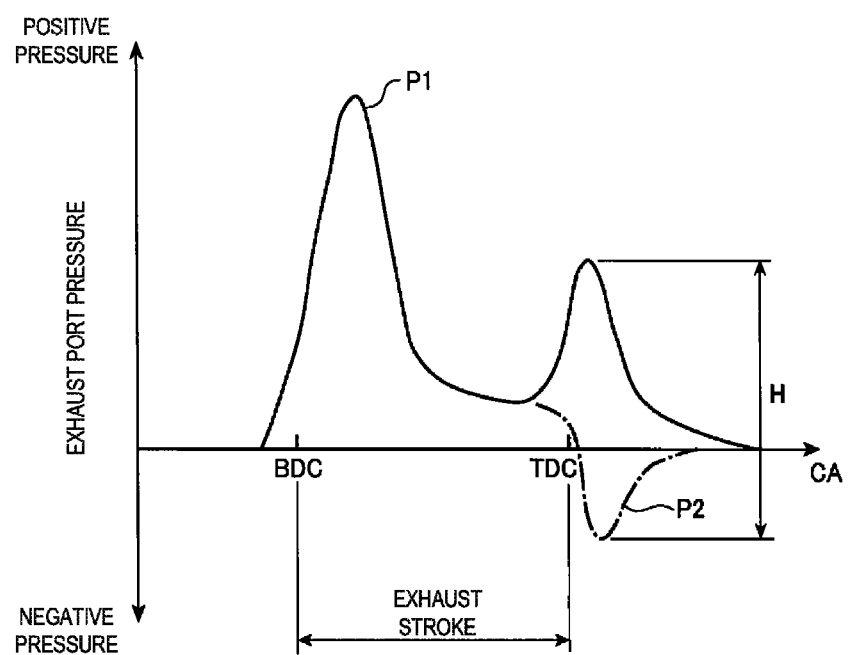
FIG. 14 is a chart showing a level of a pressure change of an exhaust port due to a flow switch of exhaust gas.

The detailed description is given as follows about, for example, exhaust interference with reference to FIG. 14. FIG. 14 is a chart showing a level of a pressure change of the exhaust port 7 of a particular cylinder due to either bypassing or not bypassing the negative pressure generating device 35. The solid waveform P1 indicates the pressure when bypassing the negative pressure generating device 35 (when the flow switch valve 45 is fully opened), and the one-dot chain waveform P2 indicates the pressure when the negative pressure generating device 35 is not bypassed (when the flow switch valve 45 is fully closed). As shown in FIG. 14, when the flow switch valve 45 is fully opened so that the exhaust gas bypasses the negative pressure generating device 35 (waveform P1), the pressure of the exhaust port 7 increases again near the end of the exhaust stroke (near the TDC) of the particular cylinder by the positive pressure generated by the blowdown gas from the cylinder of which the exhaust order is the next reaching the exhaust port 7. For example, when the chart in FIG. 14 indicates the pressure of the exhaust port 7 of the first cylinder 2A, the positive pressure generated by the blowdown gas from the third cylinder 2C of which the exhaust order is the next to the first cylinder 2A passes in the order of the independent exhaust passage 32, the bypass passage 42, the bypass passage 41, and the independent exhaust passage 31, and reaches the exhaust port 7 of the first cylinder 2A at sonic speed immediately before the end of the exhaust stroke of the first cylinder 2A, and thereby, the pressure of the exhaust port 7 increases again (exhaust interference).

On the other hand, when the flow switch valve 45 is fully closed so that exhaust gas flows into the negative pressure generating device 35 as indicated by the waveform P2, the negative pressure generated in the negative pressure generating device 35 based on the blowdown gas from the cylinder of which the exhaust order is the next reaches the exhaust port 7 near the end of the exhaust stroke of the particular cylinder (near the TDC), and thereby, the pressure of the exhaust port 7 decreases and converts into the negative pressure. For example, if the blowdown gas from the third cylinder 2C of which the exhaust order is the next to the first cylinder 2A flows into the negative pressure generating device 35 through the independent exhaust passage 32, because a large negative pressure is generated in the device 35 thereby, by the negative pressure flowing back through the independent exhaust passage 31 and reaching the exhaust port 7 of the first cylinder 2A, the pressure of the exhaust port 7 of the cylinder 2A converts into the negative pressure from near the end of the exhaust stroke.

It can be understood that the pressure of the exhaust port 7 near the end of the exhaust stroke can be changed greatly (by the amount corresponding to the height H in FIG. 14) by the exhaust gas flowing in or bypassing the negative pressure generating device 35 as above. Using this, in this embodiment, within the first operating range A1 with comparatively low engine load, by opening the flow switch valve 45 so that the exhaust gas bypasses the negative pressure generating device 35 and exhaust interference is purposely created (i.e., the pressure of the exhaust port 7 is intentionally increased), a large amount of the internal EGR gas is secured.

Note that, if simply regarding the increase of the amount of the internal EGR gas, it may also be achieved by rapidly increasing a significantly large amount of lift of the exhaust valve 9 which opens on the intake stroke. However, an excessive increase of the lift of the exhaust valve 9 causes problems, such as, the switch mechanism 14a is increased in size and a mechanical resistance, while the above-described configuration in which the internal EGR gas amount is increased by using exhaust interference can solve such problems.

On the other hand, within the second operating range A2 with higher engine load than within the first operating range A1 (particularly within the partial range on the high engine load side therein), the open/close mode of the exhaust valve 9 is switched to the normal mode and the internal EGR is prohibited, and the flow switch valve 45 is closed and the exhaust gas flows into the negative pressure generating device 35. Therefore, the negative pressure generated in the negative pressure generating device 35 reaches the exhaust port 7 and the downward suction of the exhaust gas (ejector effect) is stimulated, and thus, it is prevented that the high temperature exhaust gas remains inside the cylinder. Moreover, within the second operating range A2, because the SI combustion by the spark-ignition is performed in the state where scavenging ability inside the cylinder is secured as described above, even without a measure of greatly retarding the timing of the spark-ignition for example, an appropriate combustion with no abnormal combustion can be achieved, and a high heat release rate can be obtained while preventing the abnormal combustion.

Particularly in this embodiment, within the second operating range A2, the overlap period OL in which both the intake and exhaust valves 8 and 9 open from the late stage of the exhaust stroke to the early stage of the intake stroke (FIG. 11) is secured, and therefore, by the exhaust gas generated in the negative pressure generating device 35 reaching the exhaust port 7 during the overlap period OL as described above, a flow from the intake port 6 to the exhaust port 7 is generated and the scavenging is further stimulated.

Additionally, in this embodiment, the middle operating range A3 where the CI combustion (combustion by the self-ignition of the mixture gas) is performed is set between the first and second operating ranges A1 and A2, and within the middle operating range A3, the open/close mode of the exhaust valve 9 is set to the open-twice mode, the opening of the flow switch valve 45 is reduced. According to such a configuration, within the middle operating range A3 where the engine load is higher than the first operating range A1 on the low engine load side and the mixture gas comparatively easily self-ignites, through adjusting the exhaust gas amount for flowing into the negative pressure generating device 35 by the opening control of the flow switch valve 45, the exhaust gas suction action based on the negative pressure generated in the negative pressure generating device 35 (ejector effect) can be intensified as the engine load becomes higher, and accordingly, the internal EGR gas amount can be reduced. In this manner, within the middle operating range A3 with medium level of engine load, an appropriate amount of internal EGR gas according to the ignitability can be introduced, and an appropriate CI combustion can be performed.

Additionally, in this embodiment, the ratio of the gas and air with the fuel (G/F) (the value obtained from dividing the mass of the entire gas inside the cylinder by the mass of the fuel) within the first operating range A1 is set to 30:1 or above which is higher than that within the second and middle operating ranges A2 and A3. According to such a configuration, by introducing a large amount of gas containing the EGR gas and fresh air into the cylinder within the first operating range A1 with relatively low engine load, the G/F becomes lean and a generation of NOx (Nitrogen Oxide) is suppressed. Moreover, a pumping loss during a low engine load operation can be reduced effectively, and during the operation within the range with relatively high engine load (i.e., the middle operating range A3 or the second operating range A2), under a condition with relatively rich fuel, a high torque according to the engine load can be secured.

Moreover, in this embodiment, within the first operating range A1, the CI combustion based on the fuel injection F1 during the intake stroke is performed, and on the other hand, within the second operating range A2, the fuel injection F2 and the spark-ignition SP are performed from the late stage of the compression stroke and the early stage of the expansion stroke, and based on this, the SI combustion is performed. According to such a configuration, within the first operating range A1 with relatively low engine load, the CI combustion is performed with the homogenous mixture gas based on the fuel injection F1 during the intake stroke and the high heat release rate can be obtained. On the other hand, within the second operating range A2 on the high engine load side, because the fuel injection F2 and the spark-ignition SP are performed at the slightly late timings after the late stage of the compression stroke, the mixture gas combusts by the flame propagation after the in-cylinder temperature and pressure decrease to some extent after the compression TDC (SI combustion). Therefore, even if the geometric compression ratio of the engine is set significantly high (e.g., 16:1 or above as this embodiment) so as to achieve the CI combustion within the low engine load range, the abnormal combustion which easily occurs within the high engine load range can surely be avoided.

Particularly, in this embodiment, the injector 10 that can inject the fuel at a high injection pressure as 30 MPa or above is used. Thus, the combustion speed of the SI combustion performed within the second operating range A2 can be increased (rapid retard SI combustion). Therefore, the combustion with a short combustion period, which excels in heat release rate, can be achieved while surely avoiding the generation of the abnormal combustion, such as pre-ignition and knocking Note that, in this embodiment, the downstream end parts of the independent exhaust passages 31 to 33 are respectively formed to have a fan-shaped cross section corresponding to one-third of a whole circle, and by gathering the downstream end parts having such cross-sections, the gathering section 34 having a substantially circle shape is formed as a whole; however, the downstream ends of the independent passages 31 to 33 may be bundled by being arranged adjacently parallel to each other.

Moreover, in this embodiment, the exhaust ports 7 of two of the cylinders where the exhaust order is not adjacent therebetween (the second and third cylinders 2B and 2C) are connected with the independent exhaust passage 32 branched into two in its upstream part, the exhaust ports 7 of the other cylinders (the first and fourth cylinders 2A and 2D) are connected with the respective independent exhaust passages 31 and 33 having a singular pipe form; however, passages having a singular pipe form, similar to the independent exhaust passages 31 and 33 may be connected with the exhaust ports 7 of all four cylinders 2A to 2D, and the gathering section may be formed by bundling the downstream end parts of the independent exhaust passages.

DESCRIPTION OF REFERENCE NUMERALS

1 Engine Body
2A to 2D Cylinder
7 Exhaust Port
9 Exhaust Valve
10 Injector
11 Ignition Plug
14a Switch Mechanism
30 Exhaust Manifold
31 to 33 Independent Exhaust Passage
34 Gathering Section
35 Negative Pressure Generating Device
36 Nozzle Part
41 to 43 Bypass Passage
45 Flow Switch Valve
60 ECU (Controller)
A1 First Operating range
A2 Second Operating range
A3 Middle Operating range

The invention claimed is:

1. A multi-cylinder gasoline engine, comprising:
an engine body having a plurality of cylinders;
an exhaust manifold through which exhaust gas discharged from each of the cylinders of the engine body passes; and
a controller for controlling various instruments provided to the engine body and the exhaust manifold,
wherein the engine body includes an exhaust gas switch mechanism having, for each cylinder, an injector for injecting fuel containing gasoline and an ignition plug for igniting mixture gas by spark discharge, the exhaust gas switch mechanism switching a mode of an exhaust valve for opening and closing an exhaust port of the cylinder between a normal mode in which the exhaust valve is only opened on exhaust stroke and an open-twice mode in which the exhaust valve is also opened on intake stroke in addition to the exhaust stroke,
wherein the exhaust manifold includes:
a plurality of independent exhaust passages of which upstream end parts are connected with either one of the exhaust port of a single cylinder and the exhaust ports of two or more cylinders where the exhaust order is not adjacent thereamong;
a gathering section where downstream end parts of the independent exhaust passages are bundled while maintaining the independent state from each other;
a negative pressure generating device provided downstream of the gathering section and having a nozzle part formed to taper so that a negative pressure is generated due to the discharge of the exhaust gas from the downstream end part of the independent exhaust passage;
bypass passages extending by branching from respective intermediate parts of the independent passages, merging on the downstream side, and communicating with an exhaust passage positioned downstream of the negative generating device; and
openable-and-closable exhaust gas flow switch valves provided in the respective bypass passages,
wherein the controller controls the injector, the ignition plug, the exhaust gas switch mechanism, and the exhaust gas flow switch valve so that a CI combustion that is caused by a self-ignition of the mixture gas is performed within a predetermined first operating range and an SI combustion that is forcibly caused by a spark-ignition is performed within a second operating range set on a higher engine load side than the first operating range,
wherein within the first operating range, the exhaust gas switch mechanism is controlled so that the exhaust valve is operated in the open-twice mode and the exhaust gas flow switch valve is opened so that the exhaust gas bypasses the negative pressure generating device through the bypass passage, so that a downstream suction effect of the exhaust gas in the cylinder is invalidated through the negative pressure generated by the negative pressure generating device, and
wherein within at least a part of the second operating range on its high engine load side, the exhaust gas switch mechanism is controlled so that the exhaust valve is operated in the normal mode and the exhaust gas flow switch valve is closed so that the exhaust gas passes the negative pressure generating device, so that the downstream suction effect of the exhaust gas in the cylinder is stimulated through the negative pressure generated by the negative pressure generating device.

2. The engine of claim 1, wherein a middle operating range where the CI combustion is performed is set between the first and second operating ranges, and
wherein within the middle operating range, the exhaust gas switch mechanism is controlled so that the exhaust valve is operated in the open-twice mode, and an opening of the exhaust gas flow switch valve is reduced as the engine load becomes higher.

3. The engine of claim 2, wherein within the first operating range, a ratio of gas and air with the fuel obtained from dividing a mass of the entire gas inside the cylinder by a mass of the fuel is set to 30:1 or above which is higher than that within the second and middle operating ranges.

4. The engine of claim 1, wherein within the first operating range, the CI combustion is performed by injecting the fuel from the injector during the intake stroke, and
wherein within the second operating range, the fuel injection by the injector and the spark-ignition by the ignition plug are performed in this order from a late stage of compression stroke to an early stage of expansion stroke, and the SI combustion is performed based on the fuel injection and the spark-ignition.

5. The engine of claim 2, wherein within the first operating range, the CI combustion is performed by injecting the fuel from the injector on the intake stroke, and
wherein within the second operating range, the fuel injection by the injector and the spark-ignition by the ignition plug are performed in this order from a late stage of compression stroke to an early stage of expansion stroke, and the SI combustion is performed based on the fuel injection and the spark-ignition.

6. The engine of claim 3, wherein within the first operating range, the CI combustion is performed by injecting the fuel from the injector on the intake stroke, and
wherein within the second operating range, the fuel injection by the injector and the spark-ignition by the ignition plug are performed in this order from a late stage of compression stroke to an early stage of expansion stroke, and the SI combustion is performed based on the fuel injection and the spark-ignition.

7. The engine of claim 1, wherein within the first operating range, during the intake stroke in the open-twice mode, the exhaust valve is opened before an intake valve is opened.

8. The engine of claim 7, wherein within the first operating range, during the intake stroke, fuel injection is performed approximately when the exhaust valve is closed.

9. A multi-cylinder gasoline engine, comprising:

an engine body having a plurality of cylinders;

an exhaust manifold through which exhaust gas discharged from each of the cylinders of the engine body passes; and a controller for controlling various instruments provided to the engine body and the exhaust manifold, wherein the engine body includes an exhaust gas switch mechanism having, for each cylinder, an injector for injecting fuel containing gasoline and an ignition plug for igniting mixture gas by spark discharge, the exhaust gas switch mechanism switching a mode of an exhaust valve for opening and closing an exhaust port of the cylinder between a normal mode in which the exhaust valve is only opened on exhaust stroke and an open-twice mode in which the exhaust valve is also opened on intake stroke in addition to the exhaust stroke, so that an internal exhaust gas recirculation gas amount is increased as a large amount of exhaust gas flows back into the cylinder from the exhaust port, wherein the exhaust manifold includes:

a plurality of independent exhaust passages of which upstream end parts are connected with either one of the exhaust port of a single cylinder and the exhaust ports of two or more cylinders where the exhaust order is not adjacent thereamong;

a gathering section where downstream end parts of the independent exhaust passages are bundled while maintaining the independent state from each other;

a negative pressure generating device provided downstream of the gathering section and having a nozzle part formed to taper so that a negative pressure is generated due to the discharge of the exhaust gas from the downstream end part of the independent exhaust passage, so as to enable a downstream suction action of the exhaust gas in the cylinder through the negative pressure generated by the negative pressure generating device;

bypass passages extending by branching from respective intermediate parts of the independent passages, merging on the downstream side, and communicating with an exhaust passage positioned downstream of the negative generating device; and openable-and-closable exhaust gas flow switch valves provided in the respective bypass passages, wherein the controller controls the injector, the ignition plug, the exhaust gas switch mechanism, and the exhaust gas flow switch valve so that a CI combustion that is caused by a self-ignition of the mixture gas is performed within a predetermined first operating range, and an SI combustion that is forcibly caused by a spark-ignition is performed within a second operating range, including a substantially equivalent engine speed range as the first operating range, set on a higher engine load side than the first operating range, wherein within the first operating range, the exhaust gas switch mechanism is controlled so that the exhaust valve is operated in the open-twice mode and the internal exhaust gas recirculation gas amount is increased, and the exhaust gas flow switch valve is opened so that the exhaust gas bypasses the negative pressure generating device through the bypass passage, so that a downstream suction effect of the exhaust gas in the cylinder is invalidated through the negative pressure generated by the negative pressure generating device, and wherein within at least a part of the second operating range on its high engine load side, the exhaust gas switch mechanism is controlled so that the exhaust valve is operated in the normal mode and the exhaust gas flow switch valve is closed so that the exhaust gas passes the negative pressure generating device, so that the downstream suction effect of the exhaust gas in the cylinder is stimulated through the negative pressure generated by the negative pressure generating device.

\* \* \* \* \*